US012685274B2

(12) United States Patent　　(10) Patent No.:　US 12,685,274 B2
Cline et al.　　　　　　　　　　　(45) Date of Patent:　　　Jul. 21, 2026

(54) TURF MANAGEMENT

(71) Applicant: The Toro Company, Bloomington, MN (US)

(72) Inventors: Van Willis Cline, St. Paul, MN (US); Kathleen Sue Rice, Faribault, MN (US); Troy David Carson, Richfield, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 18/351,329

(22) Filed: Jul. 12, 2023

(65) Prior Publication Data

US 2023/0403999 A1　　Dec. 21, 2023

Related U.S. Application Data

(63) Continuation of application No. 17/451,765, filed on Oct. 21, 2021, now Pat. No. 11,737,403, which is a
(Continued)

(51) Int. Cl.
A01G 25/16　　　(2006.01)
A01G 25/00　　　(2006.01)
(Continued)

(52) U.S. Cl.
CPC ............. A01G 25/16 (2013.01); A01G 25/00 (2013.01); A01G 25/02 (2013.01); A01G 25/167 (2013.01);
(Continued)

(58) Field of Classification Search
CPC ........ A01G 25/16; A01G 25/00; A01G 25/02; A01G 25/167; G06Q 10/0633; G06Q 50/02; Y02A 40/10
See application file for complete search history.

(56) References Cited

U.S. PATENT DOCUMENTS 4,216,789 A　　8/1980　Hasenbeck
4,613,077 A　　9/1986　Aronson
(Continued)

FOREIGN PATENT DOCUMENTS

GT　　　2006000012　　　1/2008

OTHER PUBLICATIONS

Agronomic Site Assessment, Using Toro's PrecisionSense mobile mapping system, Feb. 7, 2009, 22 pages.
(Continued)

*Primary Examiner* — Chad G Erdman
(74) *Attorney, Agent, or Firm* — Merchant & Gould P.C.

(57)　　　　　　　ABSTRACT
A turf management system includes an irrigation system for providing water to the turf at a turf site, and an irrigation evaluation system for evaluating the performance of the irrigation system. The irrigation evaluation system segments the turf site into irrigation management units, where each of the irrigation management units includes at least one sprinkler head. Qualities of the turf are measured to generate collected data points. The data points are used by the irrigation evaluation system to compute a value for the turf in each of the irrigation management units. The values can then be used to identify irrigation management units having common characteristics. The values can be used to define irrigation management zones for controlling the irrigation system.

17 Claims, 21 Drawing Sheets

Related U.S. Application Data continuation of application No. 15/841,011, filed on Dec. 13, 2017, now Pat. No. 11,178,829, which is a continuation of application No. 12/895,339, filed on Sep. 30, 2010, now Pat. No. 9,872,445.

(51) Int. Cl.

| | | |
|---|---|---|
| *A01G 25/02* | (2006.01) | |
| *G06Q 10/0633* | (2023.01) | |
| *G06Q 50/02* | (2024.01) | |

(52) U.S. Cl.
CPC ......... *G06Q 10/0633* (2013.01); *G06Q 50/02* (2013.01); *Y02A 40/10* (2018.01)

(56) References Cited

U.S. PATENT DOCUMENTS

| | | | |
|---|---|---|---|
| 4,937,746 A | 6/1990 | Brundisini | |
| 5,337,957 A | 8/1994 | Olson | |
| 5,740,031 A | 4/1998 | Gagnon | |
| 5,748,466 A | 5/1998 | McGivern | |
| 5,771,169 A | 6/1998 | Wendte | |
| 5,884,224 A | 3/1999 | McNabb et al. | |
| 6,016,713 A | 1/2000 | Hale | |
| 6,041,582 A | 3/2000 | Tiede et al. | |
| 6,058,351 A | 5/2000 | McCauley | |
| 6,216,614 B1 | 4/2001 | Wollenhaupt | |
| 6,402,048 B1 | 6/2002 | Collins | |
| 6,745,128 B2 | 6/2004 | Hanson | |
| 6,889,620 B2 | 5/2005 | Fraisse et al. | |
| 6,975,245 B1 | 12/2005 | Slater et al. | |
| 6,997,642 B2 | 2/2006 | Bishop, Jr. | |
| 7,010,395 B1 | 3/2006 | Goldberg et al. | |
| 7,172,366 B1 | 2/2007 | Bishop, Jr. | |
| 7,203,576 B1 | 4/2007 | Wilson et al. | |
| 7,362,439 B2 | 4/2008 | Franzen et al. | |
| 7,413,380 B2 | 8/2008 | Corwon et al. | |
| 7,574,284 B2 | 8/2009 | Goldberg et al. | |
| 7,584,023 B1 | 9/2009 | Palmer et al. | |
| 7,628,059 B1 | 12/2009 | Scherbring | |
| 7,658,336 B2 | 2/2010 | Kates | |
| 7,789,321 B2 | 9/2010 | Hitt | |
| 7,957,843 B2 | 6/2011 | Sacks | |
| 8,024,074 B2 * | 9/2011 | Stelford | A01G 25/092 |
| | | | 700/284 |
| 8,035,403 B1 | 10/2011 | Campbell et al. | |
| 8,108,077 B2 | 1/2012 | Smith et al. | |
| 8,565,927 B1 * | 10/2013 | Campbell | A01G 25/167 |
| | | | 239/207 |

| | | | |
|---|---|---|---|
| 8,700,222 B1 | 4/2014 | Woytowitz et al. | |
| 8,793,024 B1 | 7/2014 | Woytowitz et al. | |
| 9,228,670 B2 | 1/2016 | Gizzie | |
| 9,301,461 B2 | 4/2016 | Woytowitz et al. | |
| 2001/0049563 A1 | 12/2001 | Addink et al. | |
| 2002/0169558 A1 * | 11/2002 | Smith | G01V 3/15 |
| | | | 702/5 |
| 2003/0019408 A1 | 1/2003 | Fraissse et al. | |
| 2003/0066357 A1 * | 4/2003 | Upadhyaya | G01N 3/58 |
| | | | 73/818 |
| 2005/0031416 A1 | 2/2005 | Bishop, Jr. | |
| 2005/0150160 A1 | 7/2005 | Norgaard et al. | |
| 2005/0165552 A1 | 7/2005 | Fraisse et al. | |
| 2005/0194461 A1 | 9/2005 | Goldberg et al. | |
| 2005/0203669 A1 | 9/2005 | Curren | |
| 2006/0127183 A1 | 6/2006 | Bishop, Jr. | |
| 2006/0144957 A1 * | 7/2006 | Jacobsen | A01G 25/16 |
| | | | 239/69 |
| 2006/0178847 A1 | 8/2006 | Glancy et al. | |
| 2006/0278728 A1 | 12/2006 | Kates | |
| 2007/0102538 A1 | 5/2007 | Kates | |
| 2007/0237583 A1 | 10/2007 | Corwon et al. | |
| 2007/0260400 A1 | 11/2007 | Morag et al. | |
| 2008/0097653 A1 | 4/2008 | Kaprielian et al. | |
| 2008/0098652 A1 | 5/2008 | Weinbel | |
| 2009/0150000 A1 * | 6/2009 | Stelford | A01G 25/092 |
| | | | 239/69 |
| 2009/0150001 A1 | 6/2009 | Fekete | |
| 2009/0164281 A1 | 6/2009 | Norgaard et al. | |
| 2009/0259483 A1 | 10/2009 | Hendrickson et al. | |
| 2009/0277506 A1 | 11/2009 | Bradbury et al. | |
| 2009/0302870 A1 | 12/2009 | Paterson et al. | |
| 2010/0318512 A1 | 12/2010 | Ludwig | |
| 2011/0035059 A1 * | 2/2011 | Ersavas | A01G 25/167 |
| | | | 455/466 |
| 2011/0049260 A1 | 3/2011 | Palmer et al. | |
| 2012/0095604 A1 | 4/2012 | Alexanian | |
| 2013/0191073 A1 | 7/2013 | Rice et al. | |

OTHER PUBLICATIONS

Extended European Search Report for Application No. 10858001.0 mailed Jan. 24, 2017.

International Search Report and Written Opinion for International application No. PCT/US2010/050971 dated Nov. 29, 2010, 8 pages.

"Rain Bird Tech Specs Cirrus Central Control System", (2004), 1-8 pages.

Toro SitePro Manual, (2000), 1-12 pages.

\* cited by examiner

350

352 → COLLECT DATA FROM TURF SITE

354 → SEND DATA TO DATA PROCESSING LAB

356 → PROCESS DATA WITH DATA PROCESSING LAB

358 → GENERATE RESULTS

360 → PROVIDE RESULTS FOR ADJUSTMENT OF IRRIGATION SYSTEM

FIG. 19

| AVERAGE STEEPNESS (DEGREES) | STEEPNESS SCORE |
|---|---|
| S < 2.6 | 0 |
| 2.6 ≤ S < 4 | 10 |
| 4 ≤ S < 6.9 | 20 |
| 6.9 ≤ S < 8.6 | 30 |
| 8.6 ≤ S < 12 | 40 |
| 12 ≤ S | 50 |

TURF MANAGEMENT

CROSS REFERENCE TO RELATED APPLICATION(S)

This application is a continuation of U.S. application Ser. No. 17/451,765, filed on Oct. 21, 2021, which is a continuation of U.S. application Ser. No. 15/841,011, filed on Dec. 13, 2017, issued as U.S. Pat. No. 11,178,829 on Nov. 23, 2021, which is a continuation of U.S. patent application Ser. No. 12/895,339, filed on Sep. 30, 2010, issued as U.S. Pat. No. 9,872,445 on Jan. 23, 2018, all the above-entitled TURF MANAGEMENT, the disclosures of which are hereby incorporated by reference in their entireties. To the extent appropriate, a claim of priority is made to each of the above-disclosed applications.

TECHNICAL FIELD

The present disclosure relates to turf management, and more particularly to evaluation and control of a turf irrigation system to improve the irrigation system's performance.

BACKGROUND

Turf is commonly used as a ground covering for a variety of recreational and non-recreational purposes. Because turf often needs more water than is naturally available, irrigation systems can be installed in or around the turf to provide additional water to the turf as needed. However, it can be difficult to determine when water is needed, how much water is needed, and how best to apply that water. Moreover, a variety of factors can influence the needs of the turf grass at any given location. For example, the turf grass may be growing over several different types of soil; some types, such as clay, tending to hold moisture, while other types, such as sand, tending to allow the moisture to quickly soak through. To account for such variances, it is often necessary to over-water some portions of the turf in order to provide adequate amounts of water to other portions of the turf. Over-watering, however, can be detrimental to the turf, resulting in poor turf conditions at those locations. The operation of an irrigation system in this way is inefficient and leads to unnecessary cost of operation.

SUMMARY

In general terms, this disclosure is directed to turf management. In one possible configuration and by non-limiting example, the disclosure relates to evaluation and control of a turf irrigation system to improve the irrigation system's performance.

One aspect is a method of evaluating an irrigation system at a turf site, the turf site including turf. The method includes segmenting the turf site into a plurality of irrigation management units, wherein each irrigation management unit of the turf site includes at least one sprinkler head; and for each irrigation management unit, computing with a computing device a value representing a characteristic of the turf within the irrigation management unit.

Another aspect is an irrigation system for providing water to turf at a turf site. The irrigation system includes sprinkler heads, water lines, and a control system. The water lines are connected to a source of water and to valves that control the flow of water through the sprinkler heads. The control system includes a computing device. The computing device is operably connected to the valves to selectively open the valves to allow water to flow through the sprinkler heads and onto the turf. The computing device is programmed to commonly control a first plurality of the sprinkler heads within a first irrigation management zone according to a first set of control parameters, and is programmed to commonly control a second plurality of sprinkler heads within a second irrigation management zone according to a second set of control parameters. The first plurality of sprinkler heads are all positioned in turf having a first common characteristic, and the second plurality of sprinkler heads are all positioned in turf having a second common characteristic.

A further aspect is a method of evaluating and controlling an irrigation system at a turf site including turf. The method including transporting a data collection vehicle to a turf site, the data collection vehicle including at least a location identification device and at least one instrument adapted to measure a quality of the turf; collecting data points using the data collection vehicle, by moving the data collection vehicle across the turf while operating the instrument, the data points including a value indicative of the measured quality of the turf and a location where the data point was obtained; identifying areas of the turf site having similar qualities using the data points; and defining irrigation management zones, wherein each irrigation management zone includes areas of the turf site having similar qualities.

BRIEF DESCRIPTION OF THE DRAWINGS

FIG. 19 is a chart illustrating the operation of a steepness engine of the turf management system shown in FIG. 1.

DETAILED DESCRIPTION

Figure 1:
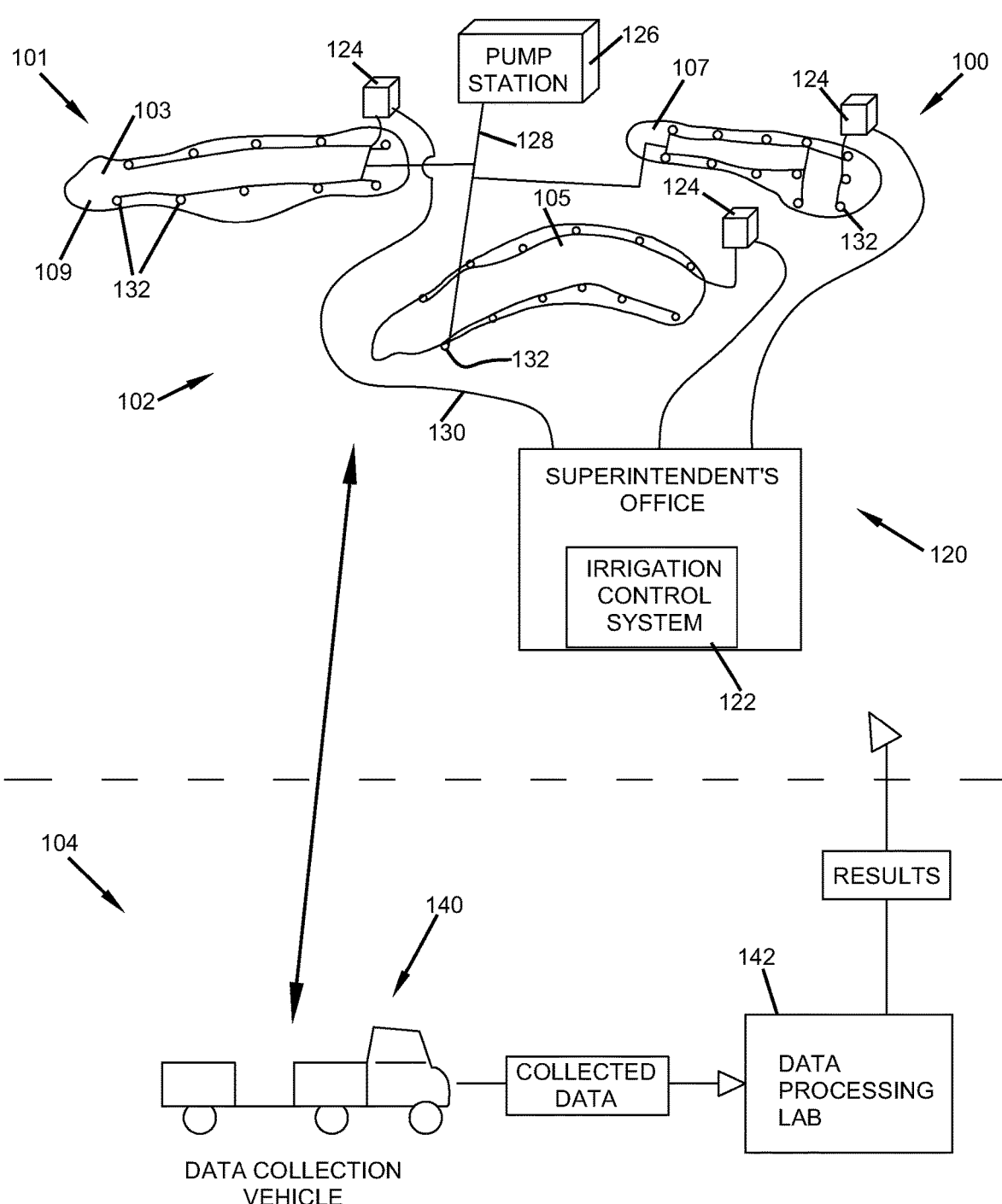
FIG. 1 is a schematic diagram of an example turf management system for management of a turf site.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram of an example turf management system 100 for management of a turf site 101. In this example, turf management system 100 includes an irrigation system 102 and an irrigation evaluation system 104.

Turf site 101 includes turf 103 to be managed by turf management system 100. As discussed above, turf sites can take a variety of recreational and non-recreational forms. By way of example, turf site 101 is described herein as a golf course, including fairways 105, 107, and 109. However, a variety of other types of turf sites can alternatively be managed by turf management system 100, such as sporting fields including baseball, soccer, football fields; turf race tracks; park lawns; residential or commercial lawns; or any of a variety of other turf sites that include turf 103. Further, turf management system 100 is not limited to fairways, and can further be used in the management of greens, tees, roughs, and surrounding lawns of the golf course in some embodiments.

Irrigation system 102 provides water to turf 103 of turf site 101. Various types of irrigation systems 102 can be used in the many possible embodiments. For example, in some embodiments irrigation system 100 includes irrigation control system 120 (such as including primary control system 122 and satellite control systems 124), pump station 126, water delivery pipes 128, control lines 130, and sprinkler heads 132. An example of irrigation system 102 is illustrated and described in more detail with reference to FIG. 2.

The term "turf" is sometimes used herein to refer to the entire ground layer including a ground covering composed of vegetation, such as grass, and the ground or soil located below the ground covering, which supports the growth of the ground covering. The present disclosure can also be used with other ground coverings, other than grass.

Figure 2:
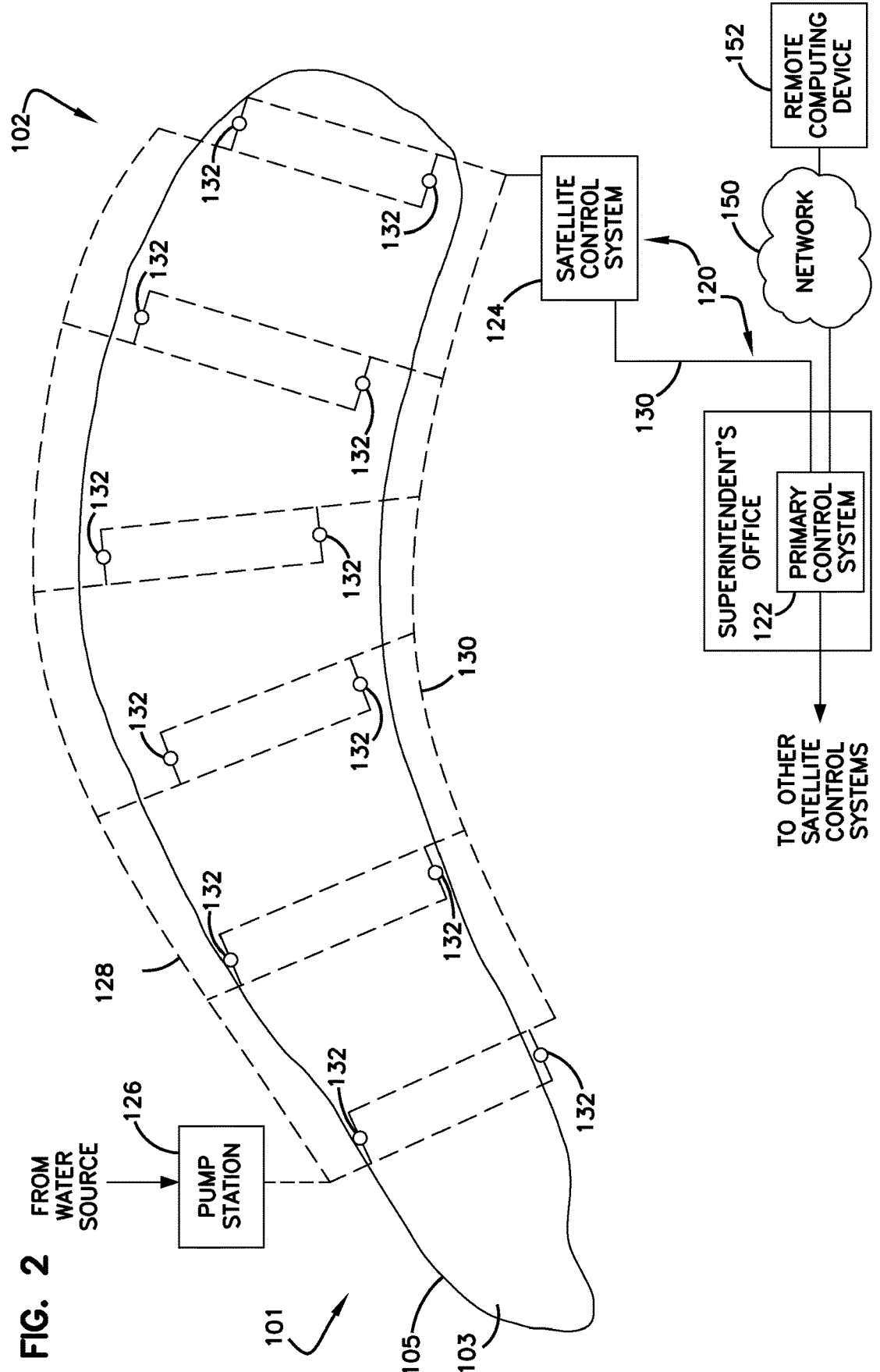
FIG. 2 is a schematic block diagram of a portion of an example irrigation system of the turf management system shown in FIG. 1.

Irrigation evaluation system 104 is a system that evaluates the performance of irrigation system 102, such as to identify ways that the irrigation system 102 can be improved. In some embodiments the irrigation evaluation system 104 further operates to define control parameters for the irrigation system 102. As shown in FIG. 2, some embodiments of irrigation evaluation system 104 include a mobile data collection device 140 and data processing lab 142.

In an example embodiment, the mobile data collection device 140 is used to collect various data about the turf 103 at turf site 101. The mobile data collection device 140 includes a plurality of sensors that measure qualities of the turf 103 at different locations as the mobile data collection device 140 is driven across the turf 103. An example of mobile data collection device 140 is described in more detail with reference to FIG. 4.

Data processing lab 142 receives the data collected by mobile data collection device 140, and processes the data. In some embodiments, the result of the data processing is the identification of physical adjustments that can be made to the irrigation system 102 to improve the performance of the irrigation system 102. For example, the results may indicate that two sprinkler heads that are currently operated as a pair should be separately controlled. As another example, the results may indicate where in-ground moisture sensors should be installed. Alternatively, or in addition, the data processing performed by the data processing lab provides information to identify adjustments that can be made to the operation of the irrigation system 102 to improve the performance of the irrigation system 102. For example, in some embodiments the data processing identifies irrigation management zones, which are regions of the turf site 101 that have similar qualities, such as similar watering requirements. The irrigation control system 120 can then be programmed to water each irrigation management zone according to the unique needs of the turf 101 in that zone. Other embodiments provide results and perform different data processing operations, as discussed herein. An example of the data processing lab 142 is illustrated and describe in more detail with reference to FIG. 8.

FIG. 2 is a schematic block diagram of a portion of an example irrigation system 102 at a turf site 101. In this example, turf site 101 is a golf course fairway 105 having turf 103 that is managed by irrigation system 102. The irrigation system 102 includes control system 120, a pump station 126, water delivery pipes 128, control lines 130, and sprinkler heads 132.

In this example, control system 120 includes a primary control system 122 and one or more satellite control systems 124. The primary control system 122 is, for example, a computing device that is centrally located, such as in the office of the golf course superintendent. The superintendent can use the primary control system 122 to monitor and control the operation of the irrigation system 102. The primary control system 122, is also a computing device, for example, which communicates with a plurality of satellite control systems 124. The primary control system 122 can coordinate and control the operation of the satellite control systems 124, which are distributed around the golf course. For example, in some embodiments each fairway has a separate satellite control system 124, or even multiple satellite control systems 124. In some embodiments, however, primary control system 122 is capable of controlling the irrigation system 102, without the need for additional satellite control systems 124. Other types and configurations of control systems can be used in other embodiments. An example of a computing device of the primary control system 122 is illustrated and described with reference to FIG. 3.

In some embodiments, control system 120 is connected to a data communication network 150, such as a local area network or the Internet. The communication network 150 can be used for communication within irrigation system 102 (such as between primary control system 122, satellite control systems 124, and sprinkler heads 132). In another possible embodiment, communication network 150 is used for communication with a remote computing device 152. One example of a remote computing device 152 is a computer utilized by the superintendent to monitor and control irrigation system 102 remotely. Another example of remote computing device 152 is a computer at the data processing lab, which can be used to send data or information to the superintendent or directly to the irrigation system 102. For example, in some embodiments the remote computing device 152 sends updated control parameters directly from the data processing lab 142 to irrigation system 102 to improve the operation of the irrigation system 102.

Pump station 126 receives water from a water source, and delivers the water to water delivery pipes 128 for distribution to sprinkler heads 132. The water source is any suitable water source, such as a city or community water supply, or a natural water source, such as a well, spring, lake, or river. The water source may include effluent or recycled water. Water from the water source is pressurized by the pump station 126 and the pressurized water is then output to water delivery pipes 128, which are typically buried in the ground. The water delivery pipes 128 are connected to each sprinkler head 132.

Control lines 130 are used, in some embodiments, for communication between the primary control system 122 and satellite control systems 124, as well as to individual sprinkler heads 132. In some embodiments control lines 130 are electrical wires through which digital messages (or other electrical signals) are communicated. For example, an individual sprinkler head can be turned on by sending a message across the control line 130 that includes a message including a unique address of the sprinkler head and an instruction for that sprinkler head to turn on. In another possible embodiment, sprinkler heads are turned on by providing power to the sprinkler head, and turned off by removing the power to the sprinkler head. Other communication and control techniques are used in other possible embodiments, such as wireless communication and telephone line communication. Decoders are used in some embodiments. Further, in some embodiments handheld wireless devices are used to control the irrigation system.

Other embodiments include other types of control lines, such as hydraulic lines. In a hydraulic system, for example, the control lines 130 are small tubes that are filled with pressurized fluid. A signal can be communicated through the tubes by adjusting the pressure of the fluid. For example, the sprinkler heads 132 are turned on by decreasing the pressure in the fluid, and turned off by increasing the pressure in the fluid.

Sprinkler heads 132 provide water from water delivery pipes 128 to the turf 103. Typically sprinkler heads 132 extend up through the turf and spray water across the upper surface of the turf 103. Sprinkler heads 132 often include a valve enclosed within the casing of the sprinkler head 132. The valve is controlled based on signals received through control lines 130 from satellite control system 124 or primary control system 122. In another embodiment, however, valves are installed along the water delivery pipes 128, such as to permit simultaneous control of multiple sprinkler heads 132 with a single valve. Any of a variety of sprinkler heads 132 can be used in other embodiments.

Further, in some embodiments the irrigation system 102 includes drip irrigation lines. Drip irrigation lines can be used to precisely deliver water to particular areas of turf 103, such as around edges of a sand trap.

Figure 3:
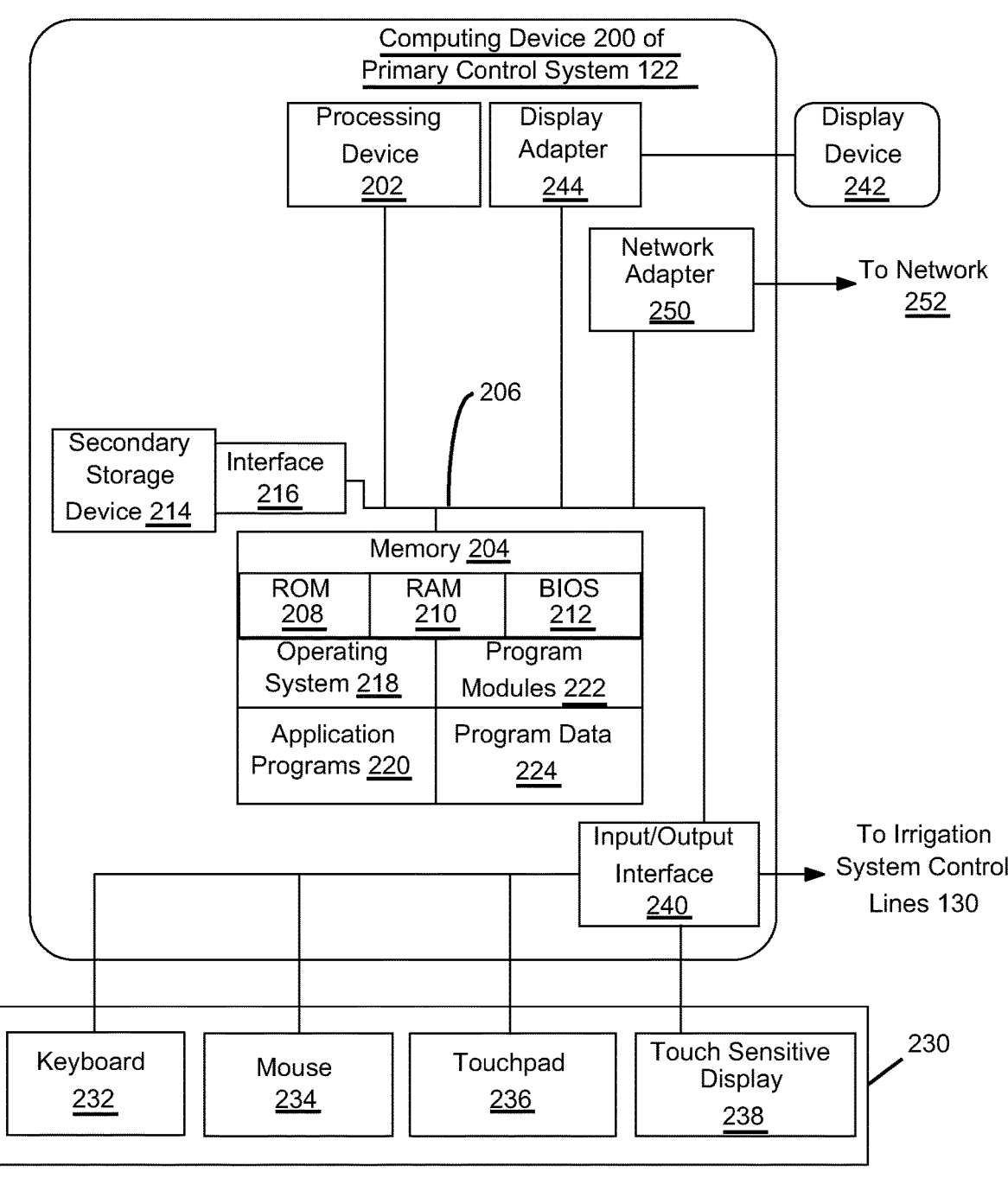
FIG. 3 is a schematic block diagram illustrating an example computing device of the turf management system shown in FIG. 1.

FIG. 3 is a schematic block diagram illustrating an example computing device 200 of the primary control system 122. Although described as being part of the primary control system 122, computing device 200 is also an example of a computing device that can be used to perform one or more of the methods, operations, computations, or processes discussed herein by other computing devices. For example, referring to FIG. 1, computing device 200 is an example of a computing device of satellite control system 124, a computing device of pump station 126, a computing device of mobile data collection device 140, a computing device of data processing lab 142, or a computing device of remote computing device 152 (shown in FIG. 2). However, some of these computing devices do not include all of the components shown in FIG. 3, such as the interface with irrigation system control lines 130. Because computing device 200 is a suitable example of these other computing devices, they will not be separately described herein.

In one example embodiment, computing device 200 is a personal computer. Other embodiments include other computing devices 200, such as a tablet computer, a smart phone, a personal digital assistant (PDA), or other device configured to process data instructions. In some embodiments, computing device 200 is an example of programmable electronics. In another possible embodiment, two or more computing devices 200 collectively form at least a portion of the programmable electronics.

Computing device 200 includes, in some embodiments, at least one processing device 202 and memory 204. A variety of processing devices 202 are available from a variety of manufacturers, for example, Intel or Advanced Micro Devices. In some embodiments, the processing device 202 is configured to perform one or more methods or operations as defined by instructions stored in a memory device. Examples of such methods and operations are described herein.

Computing device 200 also includes, in some embodiments, at least one memory device 204. Examples of memory devices 204 include read-only memory 208 and random access memory 210. Basic input/output system 212, containing the basic routines that act to transfer information within computing device 200, such as during start up, is typically stored in read-only memory 208. Memory device 204 can be a part of processing device 202 or can be separate from processing device 202.

In this example, computing device 200 also includes system bus 206 that couples various system components including memory 204 to processing device 202. System bus 206 is one of any number of types of bus structures including a memory bus, or memory controller; a peripheral bus; and a local bus using any of a variety of bus architectures.

In some embodiments, computing device 200 also includes secondary storage device 214 for storing digital data. An example of a secondary storage device is a hard disk drive. Secondary storage device 214 is connected to system bus 206 by secondary storage interface 216. Secondary storage devices 214 and their associated computer readable media provide nonvolatile storage of computer readable instructions (including application programs and program modules), data structures, and other data for computing device 200.

Although the exemplary architecture described herein employs a hard disk drive as a secondary storage device, other types of computer readable media are included in other embodiments. Examples of these other types of computer readable media include magnetic cassettes, flash memory cards, digital video disks, Bernoulli cartridges, compact disc read only memories, digital versatile disk read only memories, random access memories, read only memories, or other memory devices.

A number of program modules can be stored in secondary storage device 214 or memory 204, including operating system 218, one or more application programs 220, other program modules 222, and program data 224. In some embodiments, program modules include data instructions that are stored in computer readable media (such as computer readable storage media). The data instructions, when executed by the processing device 202, cause the processing device 202 to perform one or more of the methods or operations described herein. Program data 224 includes, for example, control parameters for the irrigation system 102 that are used by the control system 120 to define the operation of the irrigation system 102. For example, control parameters can include threshold moisture values used by the control system 120 to determine when water should be supplied to a portion of the turf 103, frequency parameters that define how frequently the water should be applied, and duration parameters that define how long water should be supplied in a single watering.

In some embodiments, a user, such as the golf course superintendent, provides inputs to the computing device 200 through one or more input devices 230. Examples of input devices 230 include keyboard 232, mouse 234, touchpad 236, and touch sensitive display 238. Other embodiments include other input devices 230. Input devices 230 are often connected to the processing device 202 through input/output interface 240 that is coupled to system bus 206. These input devices 230 can be connected by any number of input/output interfaces, such as a parallel port, serial port, game port, or a universal serial bus. Wireless communication between input devices and interface 240 is possible as well, and includes infrared, BLUETOOTH® wireless technology, 802.11a/b/g/n/z wireless communication, cellular communication, or other radio frequency communication systems in some possible embodiments.

In some embodiments, input output interface 240 is also coupled to irrigation system control lines 130, to communicate with satellite control systems 124, or to communicate directly with sprinkler heads 132.

In some embodiments, a display device 242, such as a monitor, liquid crystal display device, projector, or touch screen display device, is connected to system bus 206 via an interface, such as display adapter 244. In addition to display device 242, the computing device 200 can include various other peripheral devices (not shown), such as speakers or a printer. In some embodiments the display device 242 and touch sensitive display 238 are the same device.

When used in a local area networking environment or a wide area networking environment (such as the Internet), computing device 200 is typically connected to network 252 through a network interface or adapter 250. Other possible embodiments use other communication devices. For example, some embodiments of computing device 200 include a modem for communicating across network 252.

Computing device 200 typically includes at least some form of computer-readable media. Computer readable media include any available media that can be accessed by computing device 200. By way of example, computer-readable media include computer readable storage media and communication media.

The term computer readable media as used herein includes computer storage media. Computer storage media includes volatile and nonvolatile, removable and non-removable media implemented in any method or technology for storage of information, such as computer readable instructions, data structures, program modules, or other data. Computer readable storage media includes, but is not limited to, read-only memory 208, random access memory 210, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by computing device 200. In some embodiments, computer readable storage media is non-transitory media.

Communication media can be embodied by computer readable instructions, data structures, program modules or other data in a modulated data signal, such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. In some embodiments, communication media is transitory media. Combinations of any of the above are also included within the scope of computer readable media.

Figure 4:
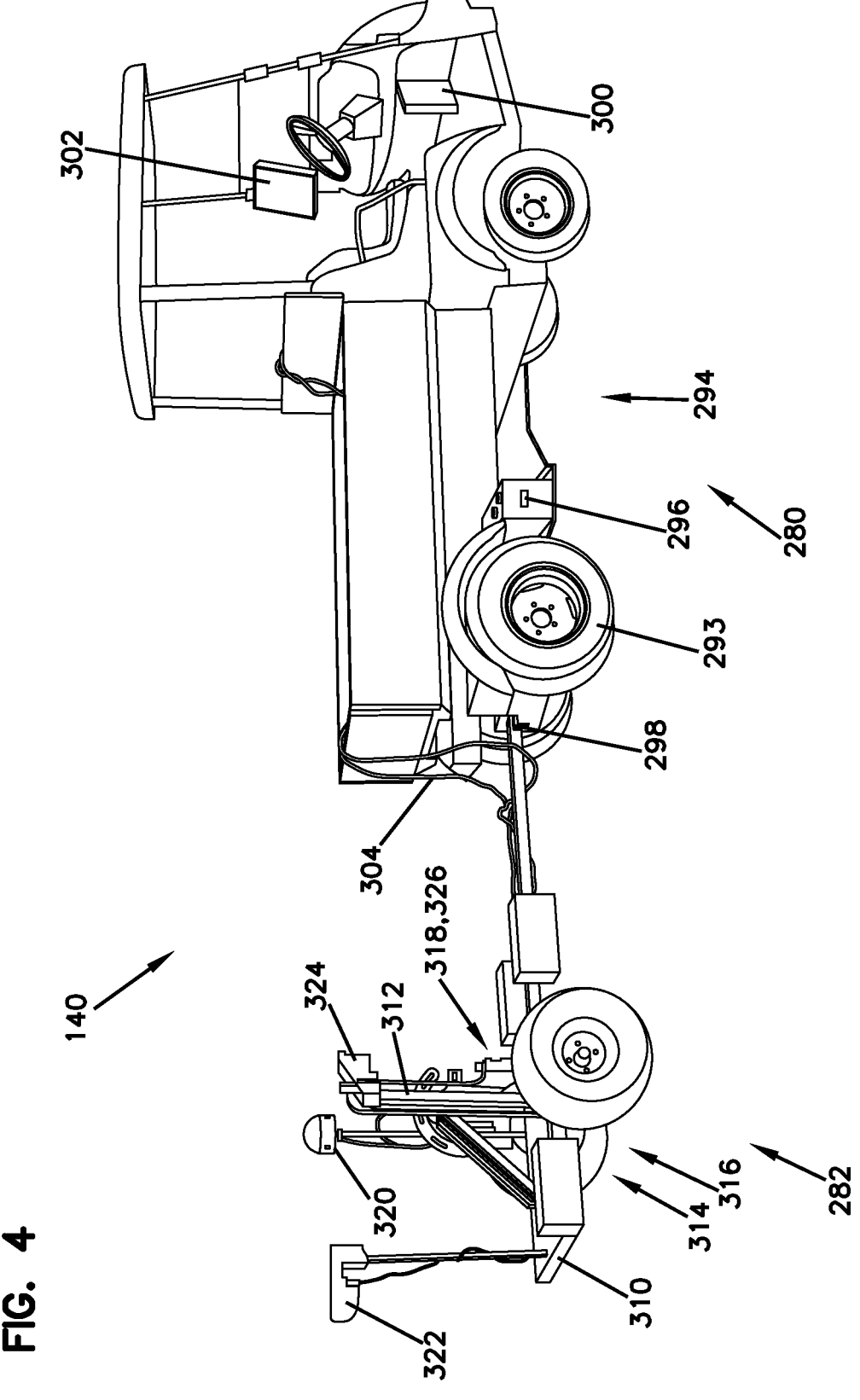
FIG. 4 is a perspective side view of an example mobile data collection device of the turf management system shown in FIG. 1.

FIG. 4 is a perspective side view of an example mobile data collection device 140 for collecting data about turf 103 at a turf site 101, such as shown in FIG. 2. In this example, mobile data collection device 140 includes a data collection vehicle 280 and a mobile turf instrument apparatus 282.

Data collection vehicle 280 is a motorized vehicle that propels the mobile turf instrument apparatus 282. Although illustrated as a separate vehicle, in some embodiments the data collection vehicle 280 and mobile turf instrument apparatus 282 are a single device.

In this example, data collection vehicle 280 includes frame 290, body 292, wheels 293, motor 294, power source 296, a trailer hitch 298, a computing device 300, display device 302, and electrical wiring 304. The data collection vehicle 280 may powered by any of a variety of power sources 296, such as gasoline or electricity from a battery. Wheels 293 are preferably of a larger width to distribute the weight of the data collection vehicle about a larger area of turf 103 (shown in FIG. 2), to reduce compaction of the soil.

Trailer hitch 298 is connected to the frame 290 of data collection vehicle 280 to permit a tongue of the mobile turf instrument apparatus 282 to be removably coupled to the data collection vehicle 280.

In this example, a computing device 300 and display device 302 are provided on data collection vehicle 280 to receive and store data collected by mobile turf instrument apparatus 282. In some embodiments, the computing device 300 displays a graphical user interface on display device 302, which displays a map of turf site 101. For example, the map is annotated with lines indicating where the data collection vehicle 280 has already gone, to assist the driver of the data collection vehicle 280 in proceeding along the appropriate data collection path. In another possible embodiment, the path is physically marked, such as with flags, foam markers, paint, chalk, or other markers.

Electrical wiring 304 connect between the mobile turf instrument apparatus 282 and computing device 300 to transfer data from the mobile turf instrument apparatus 282 to the computing device 300 where the data is stored in memory.

Mobile turf instrument apparatus 282 is coupled to data collection vehicle 280 and operates to take measurements of the turf 103 as it is moved across the surface of the turf 103. An example of a mobile turf instrument apparatus is described in U.S. Pat. No. 7,628,059 titled MOBILE TURF INSTRUMENT APPARATUS HAVING DRIVEN, PERI-ODICALLY INSERTABLE, GROUND PENETRATING PROBE ASSEMBLY, issued on Dec. 8, 2009.

In the example illustrated in FIG. 4, mobile turf instrument apparatus 282 includes a wheeled frame 310, elongated revolving arm 312, a soil moisture sensor package 314, ground penetrating probes 316, weights 318, global positioning system (GPS) device 320, spectrometer 322, compaction penetrometer 324, and salinity sensor 326.

Elongated revolving arm 312 is coupled to wheeled frame 310, and positioned within an open central space of wheeled frame 310. The elongated revolving arm 312 is revolved by a drive taken from one wheel of wheeled frame 310 to move elongated revolving arm 312 in a revolving motion.

Ground penetrating probes 316 extend from a lower end of elongated revolving arm 312 toward turf 103 (shown in FIG. 2). Weights 318 are coupled to the elongated revolving arm. When the elongated revolving arm 312 reaches a forward position, the elongated revolving arm is released and the weights 318 apply a force to the ground penetrating probes 316 to cause them to be inserted into turf 103. The elongated revolving arm 312 is allowed to pivot as the data collection vehicle 280 and mobile turf instrument apparatus 282 continue to move forward, to allow the ground penetrating probes 316 to remain in turf 103 for a period of time.

While the ground penetrating probes 316 are in the ground, the soil moisture sensor package 314 generates electrical signals at the ground penetrating probes 316. One or more measurements are then taken to evaluate a quality of the turf at that location, such as to determine the volumetric water content of the turf 103. In some embodiments, salinity sensor 326 is also coupled to ground penetrating probes 316, which generates signals to determine the salinity of soil of turf 103 at that location. Some embodiments further include a temperature sensor for measuring canopy temperature, or a compaction sensor (e.g., a compaction penetrometer or load cell) for determining the compaction of the soil at that location.

Some embodiments further include a spectrometer 322. In some embodiments, spectrometer 322 is a near infrared spectrometer sensor. In some embodiments the spectrometer 322 operates to measure the amount of photosynthetically active energy (red and blue light) absorbed by the turf canopy as an indication of photosynthesis and plant vigor. The spectrometer 322, in some embodiments, emits energy in the red and near-infrared portions of the spectrum, and measures the amount reflected by the canopy. The spectrometer 322 then calculates a normalized ratio of the two called Normalized Difference Vegetative Index (NDVI). In some embodiments the NDVI varies from 0 to 1, where the higher the NDVI value, the more vigorous the turf. The NDVI measurement is responsive to physiological changes in turf plants caused by factors such as moisture stress, nutrient deficiency or disease or insect damage which are frequently short-term in nature. Since photosynthesis is a natural process, its intensity can change with time of day and micro-climatic conditions which can in turn affect NDVI values. NDVI is also responsive to turf canopy architecture and turf density, which often reflect long-term or chronic conditions affecting turf performance. Although not separately described in more detail herein, the spectrometer data can be processed similar to the water content data, or other collected data as described herein.

GPS device 320 determines GPS coordinates for each location where data is collected. The GPS coordinates are included with each data measurement that is collected so that each measurement is associated with the location where the measurement was made.

Figure 5:
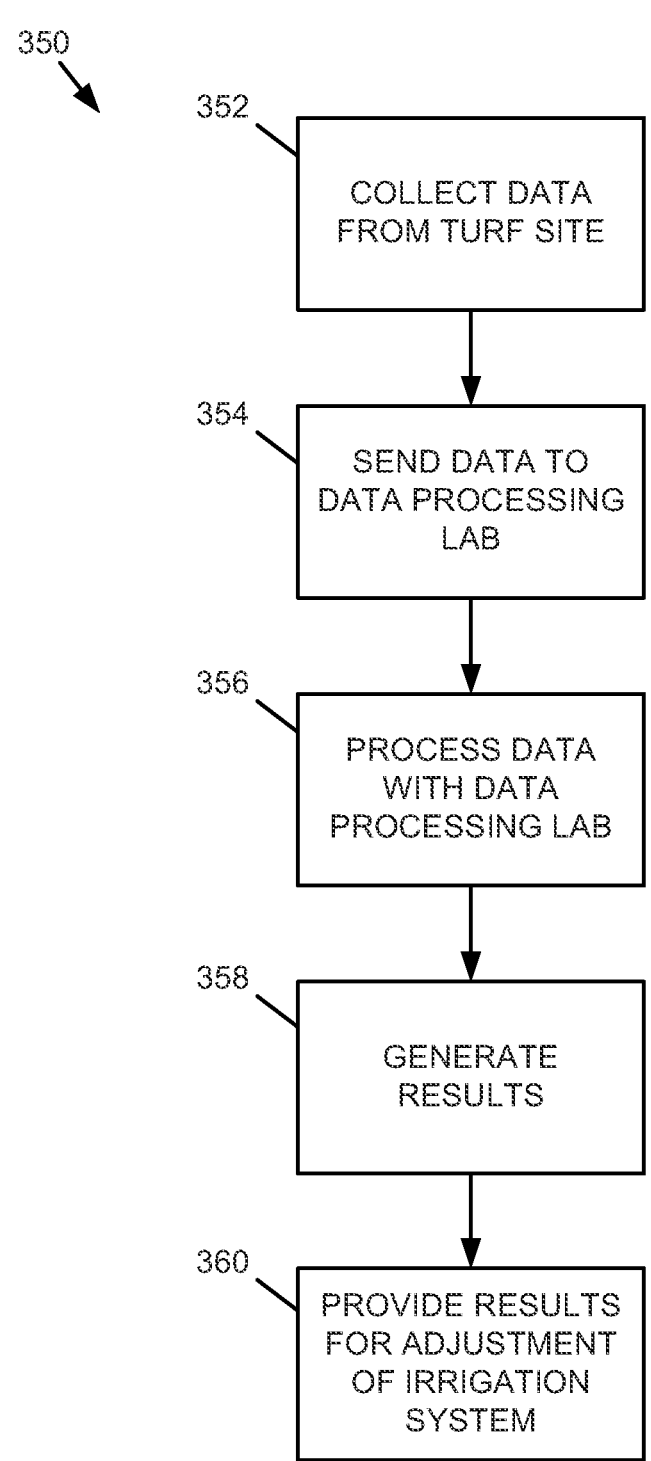
FIG. 5 is a flow chart illustrating an example method of evaluating a turf site.

FIG. 5 is a flow chart illustrating an example method 350 of evaluating a turf site. In this example, method 350 includes operations 352, 354, 356, 358, and 360. Other embodiments include more or fewer operations.

Method 350 begins with operation 352 that collects data from a turf site 101. In an example embodiment, data collection is performed by mobile data collection device 140, shown in FIG. 4. In other embodiments, other data collection devices can be used. During operation 352, one or more qualities of turf 103 (shown in FIG. 2) is evaluated. For example, one or more of the following are collected: normalized difference vegetation index (an indication of turf vigor), compaction (measured as the force required to insert a probe into the soil), volumetric water content percentage (such as measured by time-domain reflectometry or capacitance), soil salinity (such as using the Turf Guard™ system available from The Toro Company, or a Wenner array), and location (such as using GPS device to measure latitude, longitude, and altitude). An example of operation 352 is illustrated and described in more detail with reference to FIGS. 6-7.

A variety of alternative data collection devices can be used in other embodiments, such as a hand-held instrument, or instruments mounted on a frame or cart that are pushed or pulled along the turf site 101, or other devices suitable for collecting data about the turf site 101.

Operation 354 is then performed to send the data collected in operation 352 to the data processing lab 142, shown in FIG. 1. The data can be transferred using any of a variety of data communication techniques, such as by transferring the data across the Internet, storing the data on a computer-readable medium (such as a flash drive, CD-ROM, external hard disk drive, or other computer-readable medium) and mailing or delivering the computer-readable medium to the data processing lab 142, etc.

Once the data has been received by the data processing lab 142, operation 356 is performed to process the data. A variety of data processing operations can be performed. Some example data processing operations are illustrated and described herein with reference to FIGS. 8-21. As one example, the data is processed to identify boundaries of a plurality of irrigation management units. One or more qualities can then be determined for each irrigation management unit. As another example, the data is processed to identify a plurality of irrigation management zones, where each zone includes one or more of the irrigation management units. Each irrigation management unit within an irrigation management zone is determined to have one or more qualities that are similar to the other irrigation management units in the irrigation management zone.

Operation 358 is then performed to generate results based on the data processing. One example of a result is the identification of irrigation management zones. Another example of a result is the identification of control parameters that define how the irrigation system should operate with respect to each irrigation management zone. Another example of a result is the generation of color coded maps that visually illustrate the results that have been obtained.

Another example of a result is the identification of locations for in-ground moisture sensors. A further example of a result is the identification of physical changes that could be made to the irrigation system to improve the performance of the irrigation system. For example, the results may identify pairs of sprinkler heads that should be decoupled to permit the irrigation system to control the sprinkler heads differently. Other results can also be obtained.

Operation 360 is then performed to provide the results to permit the irrigation system to be adjusted. The results can be provided, for example, to the golf course superintendent, who can evaluate the results and make the desired adjustments. In another possible embodiment, the results are provided directly to the irrigation control system 120, such as by transferring the results across the Internet or delivering the results to the irrigation control system 120 on a computer-readable medium. The results can be, for example, in the form of control parameters, program data, or application programs or plug-ins. The results modify the operation of the irrigation control system 120. Examples of operation 360 are illustrated in FIG. 1.

Figure 6:
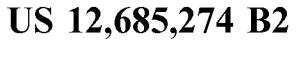
FIG. 6 is a schematic diagram illustrating the collection of data from the turf site.

FIG. 6 is a schematic diagram illustrating the collection of data from turf site 101. The process of collecting data shown in FIG. 6 is an example of operation 352, shown in FIG. 5.

In this example, turf site 101 includes a fairway 105 which is covered in turf 103. Sprinkler heads 132 are distributed around the fairway 105 to provide water to turf 103.

In this example embodiment, the mobile data collection device 140 performs several operations to collect data relating to fairway 105. The operations can be performed in any desired order. In one example, however, the operations are performed as follows. First, the mobile data collection device 140 is driven along the boundary of fairway 105 to identify the edges of the turf 103 that is going to be evaluated. Second, the locations of sprinkler heads 132 are determined by driving across each sprinkler head 132, and logging the location of each sprinkler head 132. Third, a data collection sweep of the turf 103 is performed to collect data about the turf 103 within the boundaries of the boundary pass.

Each operation will now be described in more detail. The boundary pass is performed to identify boundary 384 of the fairway 105. In some embodiments, only GPS device 320, shown in FIG. 4, is used to collect GPS data during the boundary pass, and other instruments can be turned off or temporarily disabled. The boundary pass can be completed quickly because the mobile data collection device 140 does not need to perform soil sampling. The mobile data collection device 140 begins the boundary pass at starting point 382 and collects GPS data as it moves along boundary 384. The GPS data includes, for example, latitude, longitude, altitude, speed, and time data. The boundary pass continues until the mobile data collection device arrives at the end point 382, which is the same as the starting point of the boundary 384. The boundary location data is stored with the computing device 300, shown in FIG. 4.

Locations of sprinkler heads 132 are determined by driving the mobile data collection device 140 to the location of each sprinkler head 132. When the mobile data collection device 140 arrives at a sprinkler head 132, the GPS unit is positioned directly above the sprinkler head 132 and the GPS coordinate is logged. For example, an input is provided to the computing device 300 on the data collection vehicle 280 (both shown in FIG. 4) to indicate that a sprinkler head has been located. The sprinkler head location data is then stored with the computing device 300.

A turf sweep is performed to collect the individual data points relating to turf 103 located within the boundary 384. In this example, the turf sweep began at starting point 386 and proceeded along a plurality of passes 388, 390, 392, and continued 394 until all data has been collected. Each pass is typically spaced approximately evenly from adjacent passes. For example, pass 388 may be spaced approximately 6-10 feet from pass 390, and pass 390 may be spaced approximately 6-10 feet from pass 392, etc. In some embodiments, each pass is about 8-10 feet apart. Wider or narrower passes can be used if desired.

During the turf sweep, the GPS device 320 continues to collect location data to identify the location where each data point is collected. In addition, at least one other instrument or device operates to measure a quality of the turf 103, such as the water content, soil salinity, color, and soil compaction. Data points are typically spaced approximately evenly along each pass 388, 390, 392, etc. For example, in some embodiments a data point is taken about every 6-10 feet, or approximately every 8 feet.

A larger spacing between data points and between passes can be used to reduce the number of data points collected, such as to increase the speed of data collection, to reduce the amount of data to be processed, to reduce the number of holes formed in turf 103 by the ground penetrating probes, or to reduce compaction caused by the mobile data collection device 140. Larger spacing may be suitable if qualities of the turf tend to vary gradually along the turf.

A smaller spacing between data points and between passes can be used to increase the number of data points collected, such as to obtain finer resolution of data points. The finer resolution may be desirable if the turf 103 tends to have more drastic variations, such as caused by large changes in steepness or aspect, or widely varying soil conditions. Smaller spacing can also be desirable for smaller turf areas, such as greens.

The turf sweep continues until the entire region within boundary 384 has been sampled. In some embodiments, turf site 101 includes multiple sections, in which case the process is then repeated for each section. For example, turf site 101 can include 9, 18, or more fairways which are all managed by irrigation system 102. Accordingly, data can be collected from all of the fairways using the same or similar process until the entire turf site 101 of interest has been sampled. The data is then stored, such as in computing device 300, shown in FIG. 4.

The timing of when a data collection operation is performed will depend on the goal of the irrigation system evaluation. If the goal of the evaluation is to determine the inherent properties of the soil and turf at the turf site 101, the data collection operation should be performed shortly after a heavy rain, which provides a substantially uniform amount of water to the turf site 101. In this state, turf site 101 is said to be at field capacity. The data that is collected when turf site 101 is at or near field capacity, will reflect the natural variations in the turf site 101. For example, differences in soil type will influence moisture readings. Soil that is primarily sand will tend to permit the water to pass through quickly, resulting in a lower moisture content measurement, while soil that is high in clay and organic matter will tend to hold the moisture, resulting in a higher moisture content measurement. As another example, an area of the turf site 101 that has a steep slope will tend to allow the water to run off of that area before the water can soak into the turf. Therefore the turf in that area will tend to have a lower moisture content measurement than areas which are flat.

In contrast, if the goal of the evaluation is to evaluate the performance of the irrigation system, the data collection operation should be performed after a period in which little or no rain has fallen. In this case, the moisture in the soil will largely reflect the performance of the irrigation system 102.

Further, in some embodiments the data collection operation is performed multiple times, such as once after a heavy rain, and again after a dry spell. The data can then be compared to provide even more information about the turf site 101 and irrigation system 102.

Figure 7:
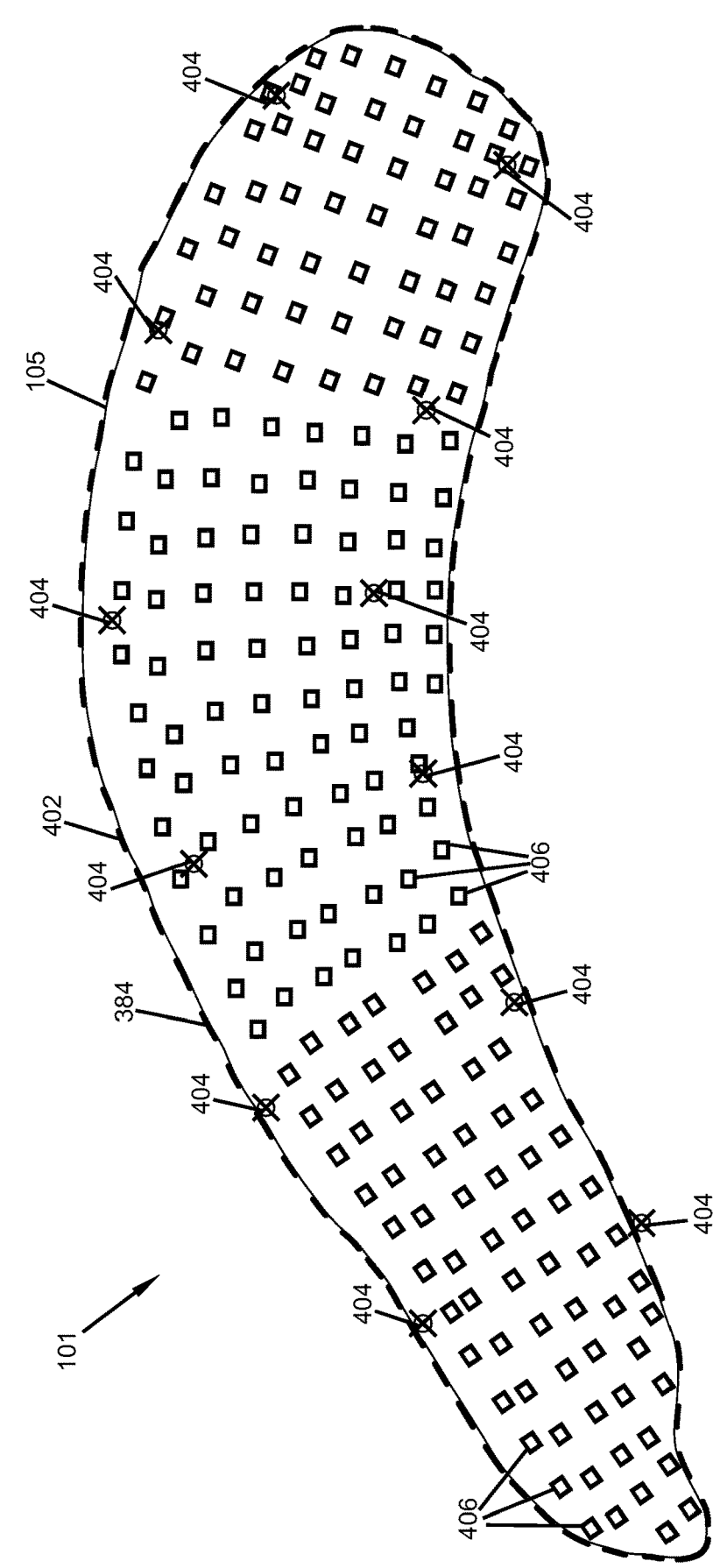
FIG. 7 is a graphical illustration of the data collected in FIG. 6.

FIG. 7 graphically illustrates the data collected in operation 352, shown in FIG. 5, and the process shown in FIG. 6. In the example described in FIG. 6, a fairway is sampled and data is collected regarding the turf 103 located within the boundary 384 of the fairway. The data includes boundary location data 402, sprinkler head location data 404, and data points 406.

Once the data is obtained, it is stored in a data file, such as in a comma separated values (CSV) format. Other file formats can be used, such as spreadsheet file format, a table format, or a binary file format.

In some embodiments, all of the collected data includes location data, including latitude and a longitude where the data was collected. Accordingly the data can be graphically depicted as shown in FIG. 7, where the data is shown at the location where it was collected.

The data can include, for example, boundary location data 402 which identifies the location of boundary 384 of the fairway 105. The data can also include, for example, sprinkler head location data 404, which identifies the location of each sprinkler head 132 associated with fairway 105. The data can further include, for example, data points 406, which identify at least one quality of the turf at the location of the data point 406.

As shown in FIG. 5, the data is then sent to data processing lab 142, such as in operation 354.

Figure 8:
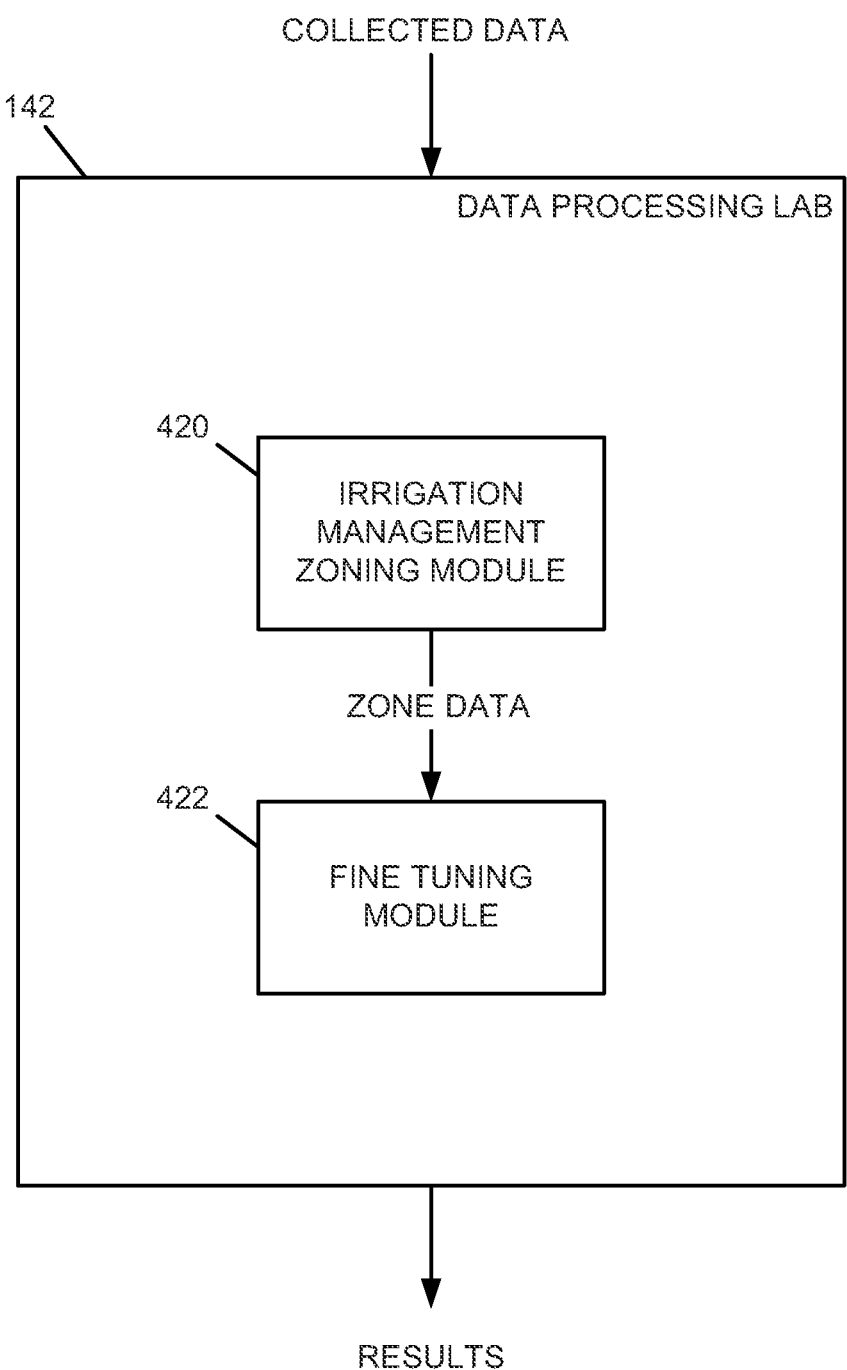
FIG. 8 is a schematic block diagram of an example data processing lab of the turf management system shown in FIG. 1.

FIG. 8 is a schematic block diagram of an example data processing lab 142 that receives the data collected by the mobile data collection device 140. In this example, data processing lab 142 includes an irrigation management zoning module 420 and a fine tuning module 422.

In one example embodiment, data processing lab 142 receives the collected data and processes the data to identify irrigation management zones. Each irrigation management zone is a region (or multiple regions) of the turf site 101 that have similar qualities, such as similar needs for watering. In some embodiments, the irrigation management zones are initially determined based, at least in part, on the water content data points that were collected for the turf site 101. An example of the irrigation management zoning module 420 is illustrated and described in more detail with reference to FIG. 9.

Some embodiments further include a fine tuning module 422. The measured water content for a turf site 101 only provides some of the data regarding the needs of the turf in given regions of turf site 101. Additional factors can also be important to evaluate, and can result in the need to modify the bounds of the irrigation management zones identified by the irrigation management zoning module. Examples of such factors include soil salinity and topography. These factors are evaluated by the fine tuning module 422, which utilizes additional data from the collected data. The results of the data processing performed by the fine tuning module can be used to modify the irrigation management zones, or to otherwise adjust the results that are then output from the data processing lab 142. An example of the fine tuning module 422 is illustrated and described in more detail with reference to FIG. 16.

Data processing lab 142 typically includes at least one computing device, such as the computing device illustrated in FIG. 3, which performs at least some of the data processing operations of data processing lab 142. In some embodiments the data processing lab 142 is fully automated, such that all operations are performed by one or more computing devices. In another embodiment, some of the operations are performed by, or involve the interaction of, a human. In some embodiments the data processing lab 142 includes software that, when executed by the computing device, performs one or more of the operations described herein.

Figure 9:
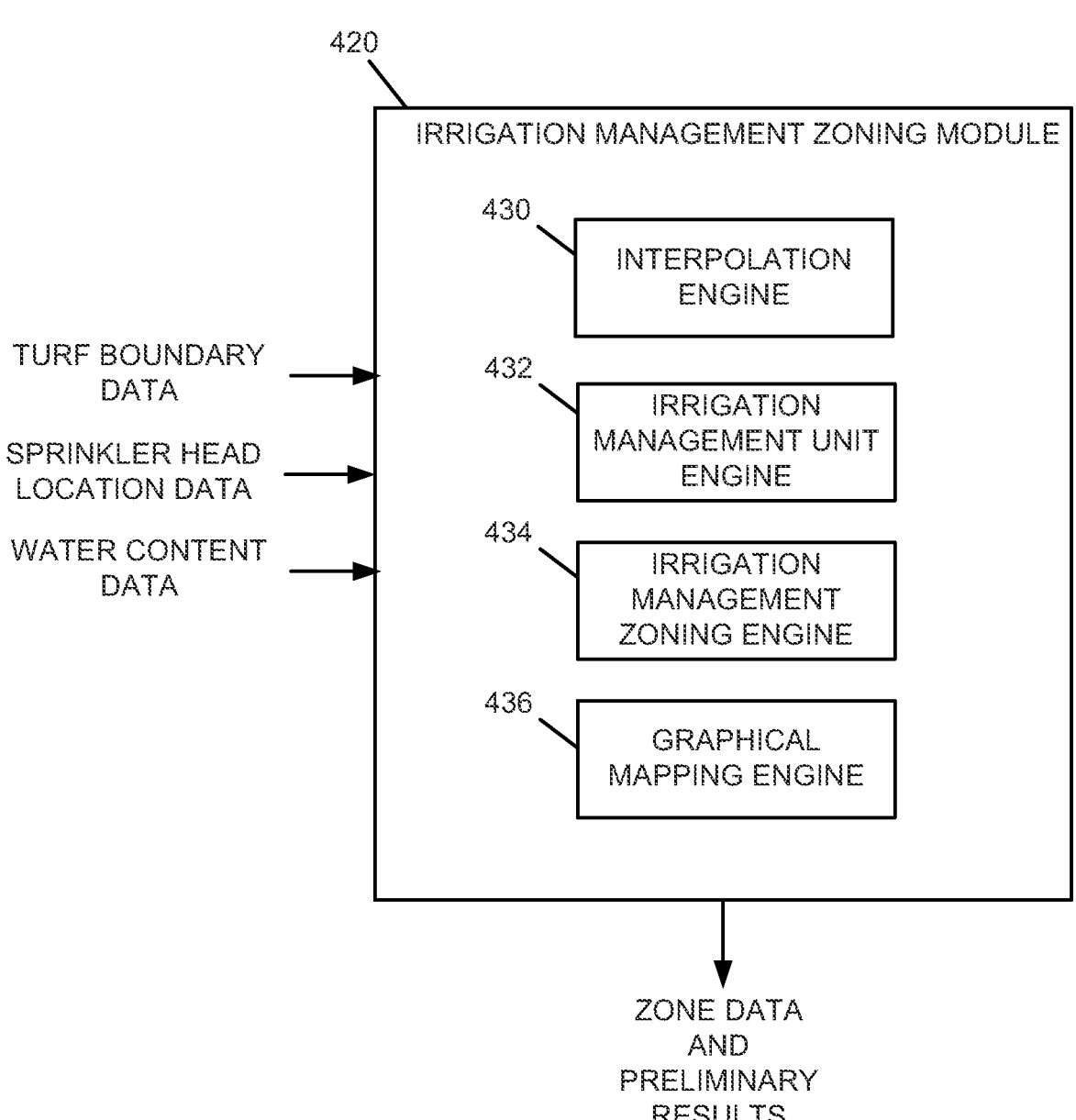
FIG. 9 is a schematic block diagram of an example irrigation management zoning module of the turf management system shown in FIG. 1.

FIG. 9 is a schematic block diagram of an example irrigation management zoning module 420. In this example, irrigation management zoning module 420 includes interpolation engine 430, irrigation management unit engine 432, irrigation management zoning engine 434, and graphical mapping engine 436.

Figure 10:
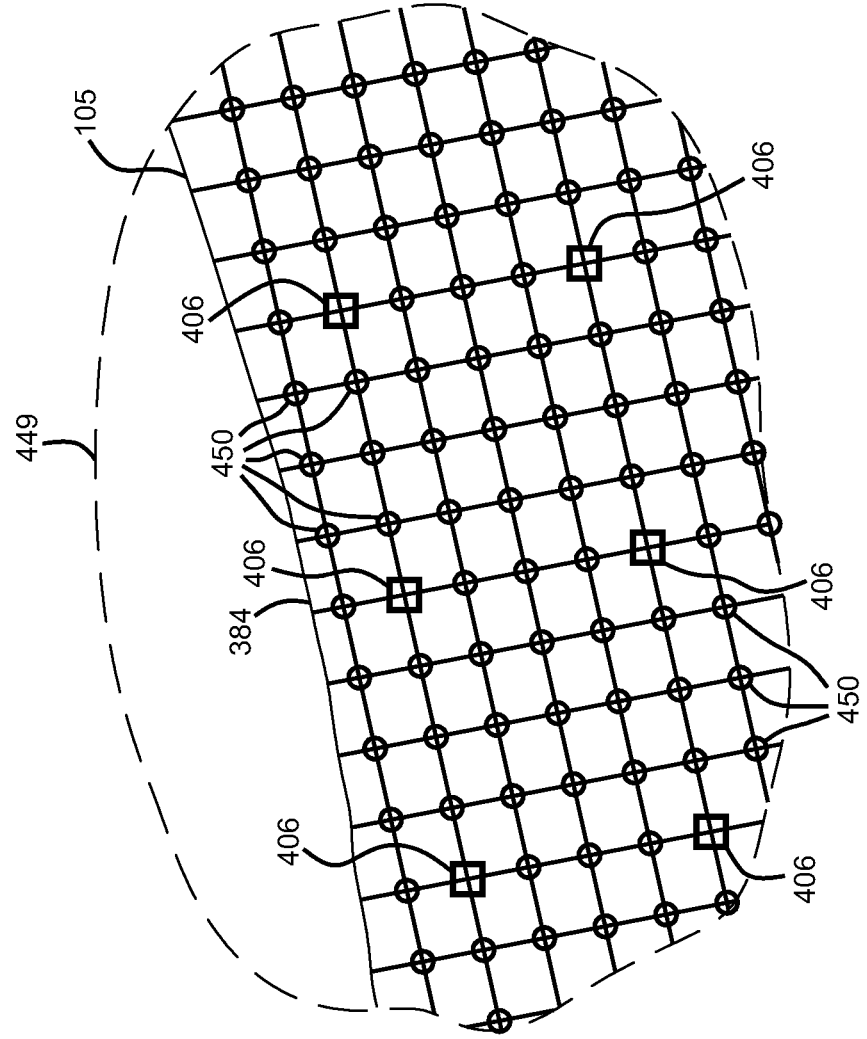
FIG. 10 is a graphical representation of interpolated data as computed by the turf management system shown in FIG. 1.

Interpolation engine 430 operates to improve the resolution of data points, such as to convert the collected data points 406, shown in FIG. 7, to fine data points 450, such as shown in FIG. 10. In some embodiments the initial data collection operates to measure qualities of the turf 103 at spaced intervals. For example, the data points can be collected in a grid pattern, where each data point is spaced approximately eight to ten feet from adjacent data points. The interpolation engine 430 processes the data to identify fine data points, which are estimated values at locations between known data points. An example of the interpolation engine 430 is described in more detail with reference to FIG. 10.

Irrigation management unit engine 432 operates to segment the turf site 101 into a plurality of irrigation management units. In some embodiments, an irrigation management unit is the smallest region of the turf site 101 for which the irrigation system 102 can control. In a typical irrigation system 102, the smallest region that the irrigation system 102 can control is defined by a single sprinkler head. The area immediately surrounding each sprinkler head defines a single irrigation management unit, which is primarily controlled by that sprinkler head. The irrigation management unit engine 432 operates to identify each of the irrigation management units, and to define the boundaries of each unit. An example of the irrigation management unit engine 432 is illustrated and described in more detail with reference to FIGS. 12-13.

Irrigation management zoning engine 434 operates to group irrigation management units, identified by the irrigation management unit engine 432, into irrigation management zones. For example, the irrigation management zoning engine 434 identifies irrigation management units having similar characteristics, and groups those units into a single irrigation management zone. In some embodiments, the irrigation system 102 can be programmed to control all of the sprinkler heads within an irrigation management zone the same, due to the similar characteristics of the turf within that zone. An example of the irrigation management zoning engine is illustrated and described in more detail with reference to FIGS. 14-15.

Graphical mapping engine 436 operates to graphically display data on a map of the turf site 101. The graphical display shows the results of the data processing in a format that is easy to understand by the user or another human, such as the golf course superintendent. The graphical displays can be printed or saved in an electronic format to be included with the results provided back to the person in charge of the turf site 101, such as the superintendent. In some embodiments, graphical mapping engine 436 utilizes the Google Earth program provided by Google Inc. For example, satellite imagery can be displayed with Google Earth, and data overlays can then be generated to graphically depict data over the satellite imagery. Several examples of graphical displays are shown in FIGS. 7, 10-13, 15, and 17.

FIG. 10 is a graphical representation of interpolated data calculated by the interpolation engine 430, shown in FIG. 9, based on data collected from a turf site 101. Only a portion of the interpolated data is illustrated in FIG. 10, as indicated by the broken line 449.

The graphical representation illustrates a fairway 105 of a turf site 101, having a boundary 384. Spaced apart data points 406 were collected from the turf site 101. The data points 406 are interpolated to generate fine data points 450 which are associated with locations that are closer together than the locations associated with collected data points 406, resulting in higher resolution data. For example, if the collected data points 406 are taken at eight foot by eight foot intervals, the fine resolution data points can be generated for smaller intervals, such as two foot by two foot intervals. Other intervals can be used, such as one foot or smaller intervals, or larger intervals.

A variety of interpolation techniques can be used in various embodiments, such as linear interpolation, polynomial interpolation, spline interpolation, etc. Some embodiments utilize geostatistical interpolation techniques, such as kriging. Kriging assumes a spatial relationship between the data, and therefore compares data points with adjacent data points when computing fine data points 450.

Because data points 406 are only available at locations within boundary 384, the boundary data 402 (shown in FIG. 7) can be used to identify boundaries of the interpolation. The interpolation computes fine data points 450 for all locations within boundary 384.

In some embodiments, fine data points 450 are computed for all locations that fall at intersections of a spaced grid. For example, a two foot by two foot grid is defined by the interpolation engine. Fine data points 450 are then computed for each intersection of the grid. The intersections may not align with all of the collected data points 406, and so collected data points 406 may not be included in fine data point 450, unless they do properly align.

In some embodiments, collected data points include various qualities of the turf, such as water content, soil salinity, vigor, etc. The data points can describe In such embodiments, interpolation can be performed for each type of data. For example, fine data points are computed for the water content by interpolating the water content data points. Similarly, fine data points are computed for soil salinity by interpolating the salinity data points. Similar interpolation can be performed for each type of data.

Figure 11:
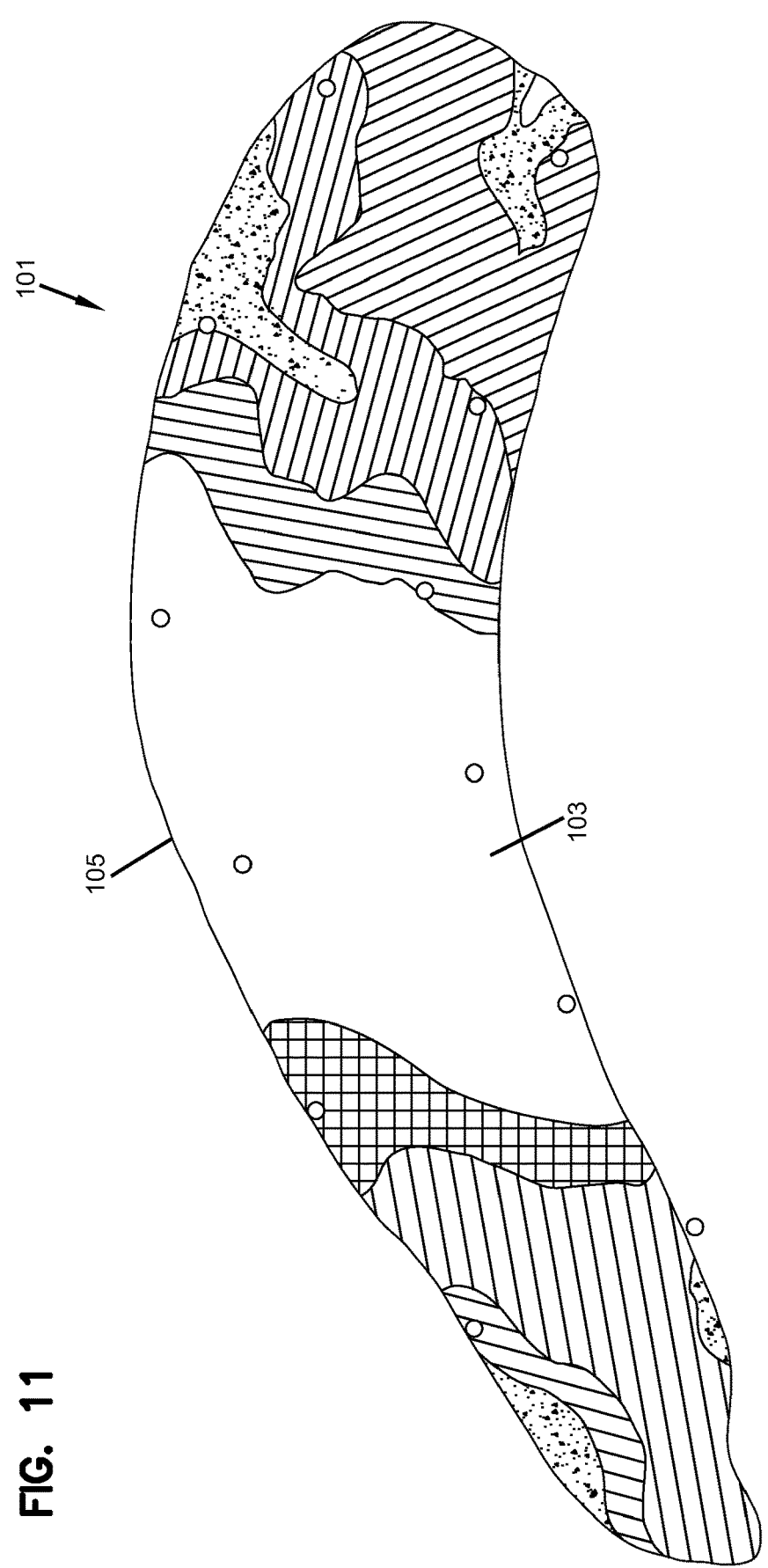
FIG. 11 is a graphical representation of the interpolated data of FIG. 10.

FIG. 11 is a graphical representation of the interpolated data for a single quality of turf 103 for fairway 105 of turf site 101. The graphical representation is generated, for example, by graphical mapping engine 436, which displays a graphical representation of fairway 105.

In this example, water content data has been interpolated to obtain fine data points. Each fine data point has a location (such as latitude and longitude) and a value (such as water content). Based on the fine data points, graphical mapping engine 436 can generate a graphical representation of the data. The graphical representation displays the values using colors that are associated with the value, and the colors are positioned at the appropriate location for each data point.

This graphical representation displays the data in a way that is easy to understand by a human.

Figure 12:
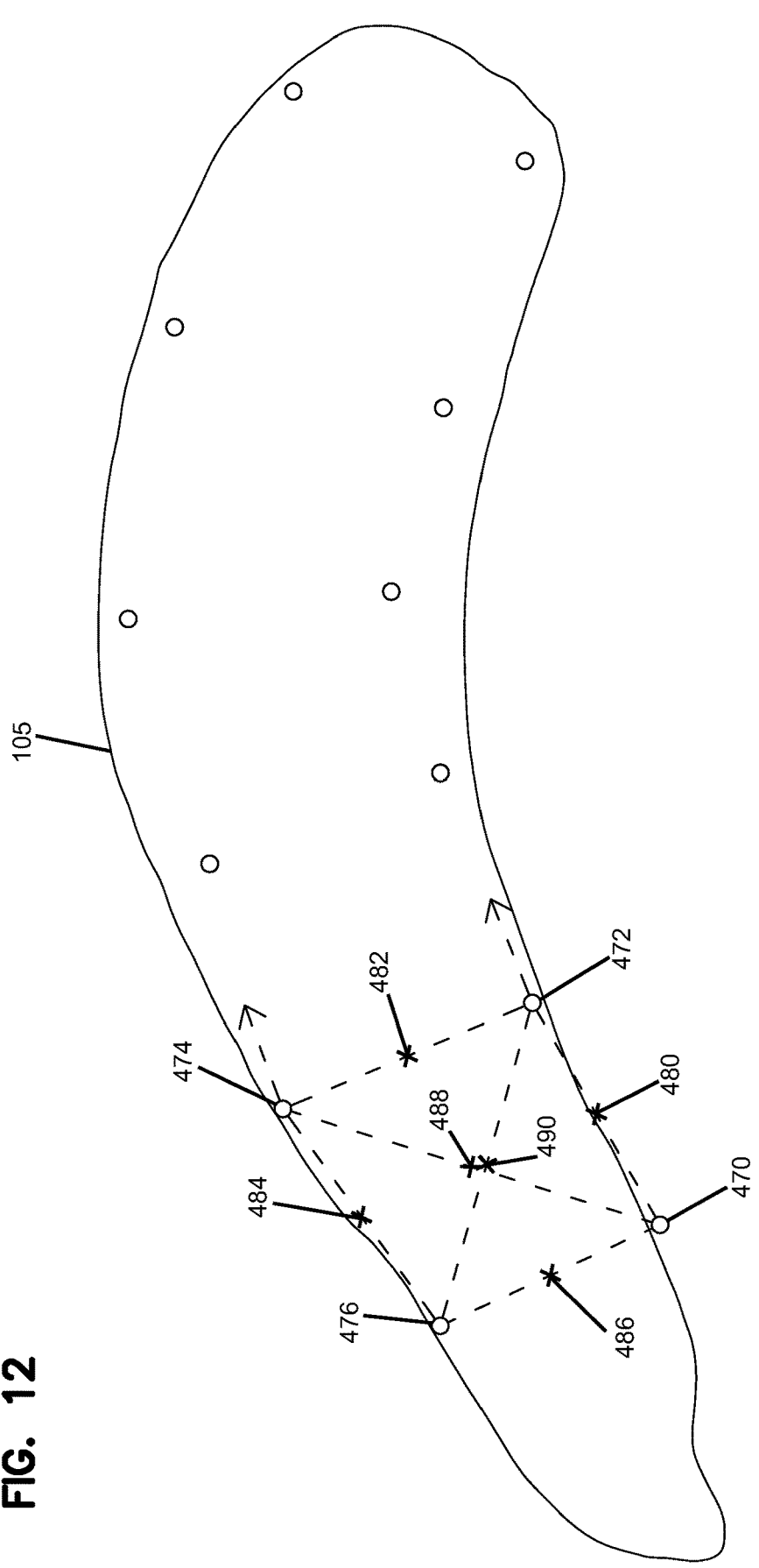
FIG. 12 is a graphical representation of operations performed by an irrigation management unit engine of the turf management system shown in FIG. 1.
Figure 13:
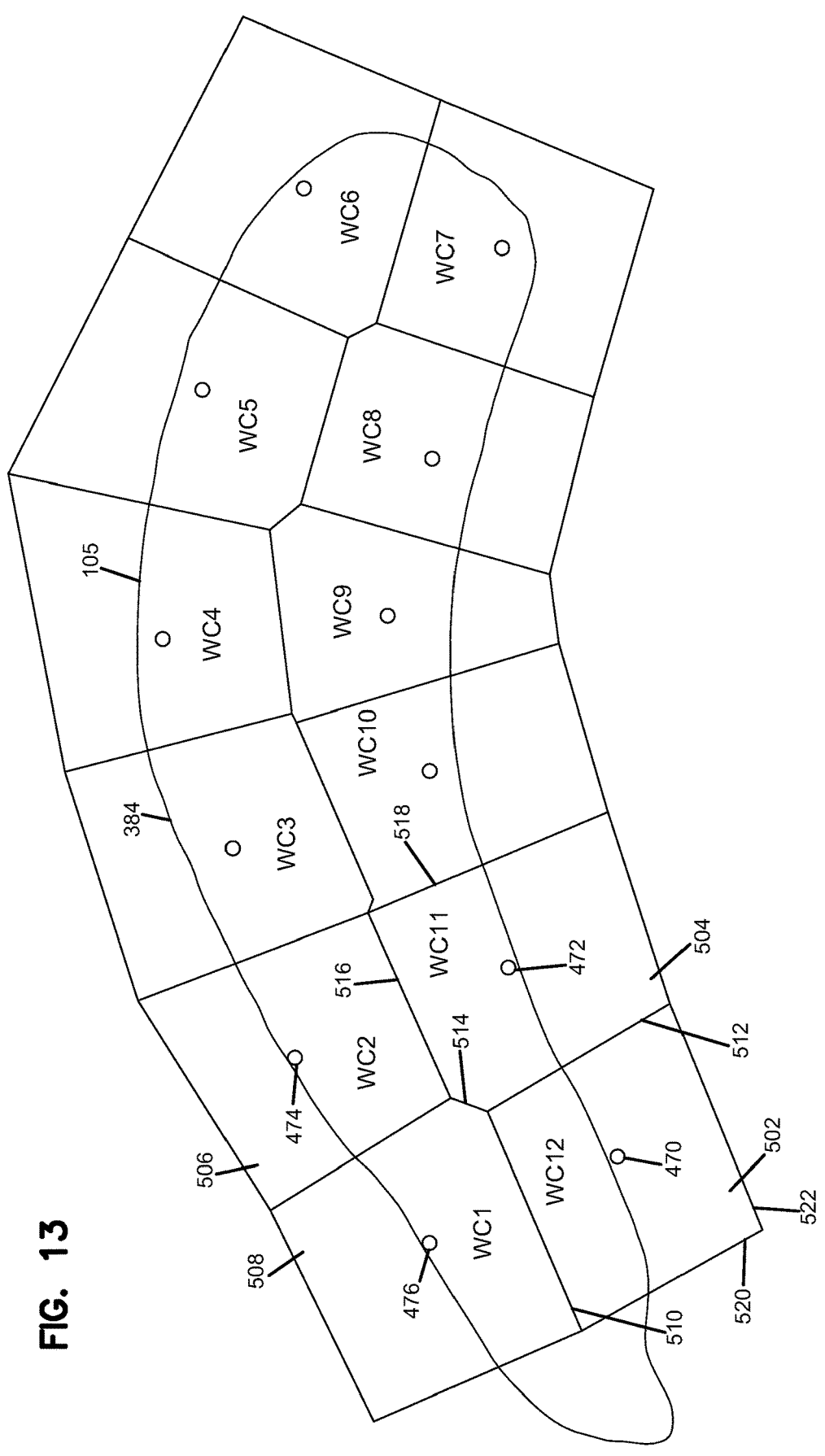
FIG. 13 is a graphical representation of additional operations performed by the irrigation management unit engine of the turf management system shown in FIG. 1.

FIGS. 12-13 illustrate an example of the operation of the irrigation management unit engine 432, shown in FIG. 9.

FIG. 12 is a graphical representation of operations performed by irrigation management unit engine 432 to define boundaries of irrigation management units. In this example, the irrigation management unit engine 432 begins by identifying the locations of all of the sprinkler heads, such as at points 470, 472, 474, 476, etc.

After the location of each sprinkler head has been determined, the irrigation management unit determines the boundaries of a region of turf site 101, where all points within the region are closer to the respective sprinkler head than any other sprinkler head. The identified region of space for each sprinkler head is referred to as an irrigation management unit.

One method of identifying the boundaries of the irrigation management units is as follows. After the sprinkler head locations have been identified, midpoints 480, 482, 484, 486, 488, 490, etc. between each sprinkler head locations 470, 472, 474, and 476 and each adjacent sprinkler head are located. For example, a line can be drawn between sprinkler head locations 470 and 472. The midpoint 480 is then identified. The same is performed between each adjacent sprinkler head.

Once the midpoints have been identified, a perpendicular bisector is drawn through each midpoint. This line is perpendicular to the line through the two sprinkler heads, and crosses through the midpoint. The perpendicular bisectors are extended until they meet another bisector, resulting in the boundaries shown in FIG. 13.

FIG. 13 is a graphical representation of additional operations performed by irrigation management unit engine 432 to define boundaries of irrigation management units.

Boundaries of the irrigation management units are defined by the perpendicular bisectors described with reference to FIG. 12. The perpendicular bisectors form polygons that define the boundaries of each of the irrigation management units. In this example, twelve irrigation management units are identified, because there are twelve sprinkler heads in fairway 105. The irrigation management units include units 502, 504, 506, and 508. Irrigation management unit 502 is bounded by bisector 510, which is the perpendicular bisector of a line crossing through sprinkler heads locations 470 and 476. Because the other ends of irrigation management unit 502 are not bounded by the process identified above (i.e., intersection of the perpendicular bisector with another perpendicular bisector), outer boundaries can be defined. In some embodiments the outer boundary is located at boundary 384 of the fairway 105, based on boundary data 402 (shown in FIG. 7). However, boundaries of fairways, such as fairway 105 can change over time. In order to accommodate for future variations in boundary 384, the outer bounds or irrigation management units can be defined as a distance away from the respective sprinkler head. For example, the outer boundaries 520 and 522 may be located twenty or thirty feet away from the sprinkler head 470. Because no data has been collected for points lying outside of boundary 384, the regions outside of boundary 384 will not be included in subsequent evaluation of the irrigation management zone (unless or until such data is gathered).

Once the irrigation management units 502, 504, 506, 508, etc. have been identified, further processing can be performed for each unit. For example, general qualities of each unit can be identified, and a number representing the quality can be assigned to the unit. Any measured quality, or quality that can be computed from measured qualities, can be evaluated.

For example, in some embodiments each irrigation management unit 502, 504, 506, 508, etc. is evaluated to determine an average water content (WC) of that unit. To compute the average moisture content for irrigation management unit 502, the irrigation management unit engine 432 identifies all fine data points 450 (shown in FIG. that are located within the boundaries of irrigation management unit 502. The estimated volumetric water content values are then identified for each fine data point 450, and an average of these values is computed. The resulting value (e.g., WC12) is saved as the average water content value for irrigation management unit 502. The same process is repeated for each irrigation management unit (504, 506, 508, etc.) until all irrigation management units have been assigned a water content value (WC1-WC11).

In some embodiments, an average value is a mean value. In other embodiments, an average value is a median value. In yet other embodiments, an average value is a value between, and not including, an extreme low value and an extreme high value. Other embodiments utilize other statistics or algorithms to compute the average value. In some embodiments an average value is about an average value.

Similarly, other qualities can be evaluated for each irrigation management unit. For example, soil salinity, soil compaction, vigor, etc. can be used to compute an average value, which is then assigned to the irrigation management unit as an indication of the average of that quality across the irrigation management unit. An example of the determination of average salinity values is illustrated and described with reference to FIG. 17.

In some embodiments, the average values are displayed on a map of the turf site 101 using graphical mapping engine 436 (shown in FIG. 9), such as in a display similar to that shown in FIG. 13, but also including the average values. In further embodiments each irrigation management unit is color coded based on the value for that unit. For example, the colors can vary from a light color to a dark color depending on the value. In another possible embodiment, colors are assigned to ranges of values. Any irrigation management unit having a value within a first range of values is displayed in a first color. Any irrigation management unit having a value within a second range of values is displayed in a second color, etc.

Figure 14:
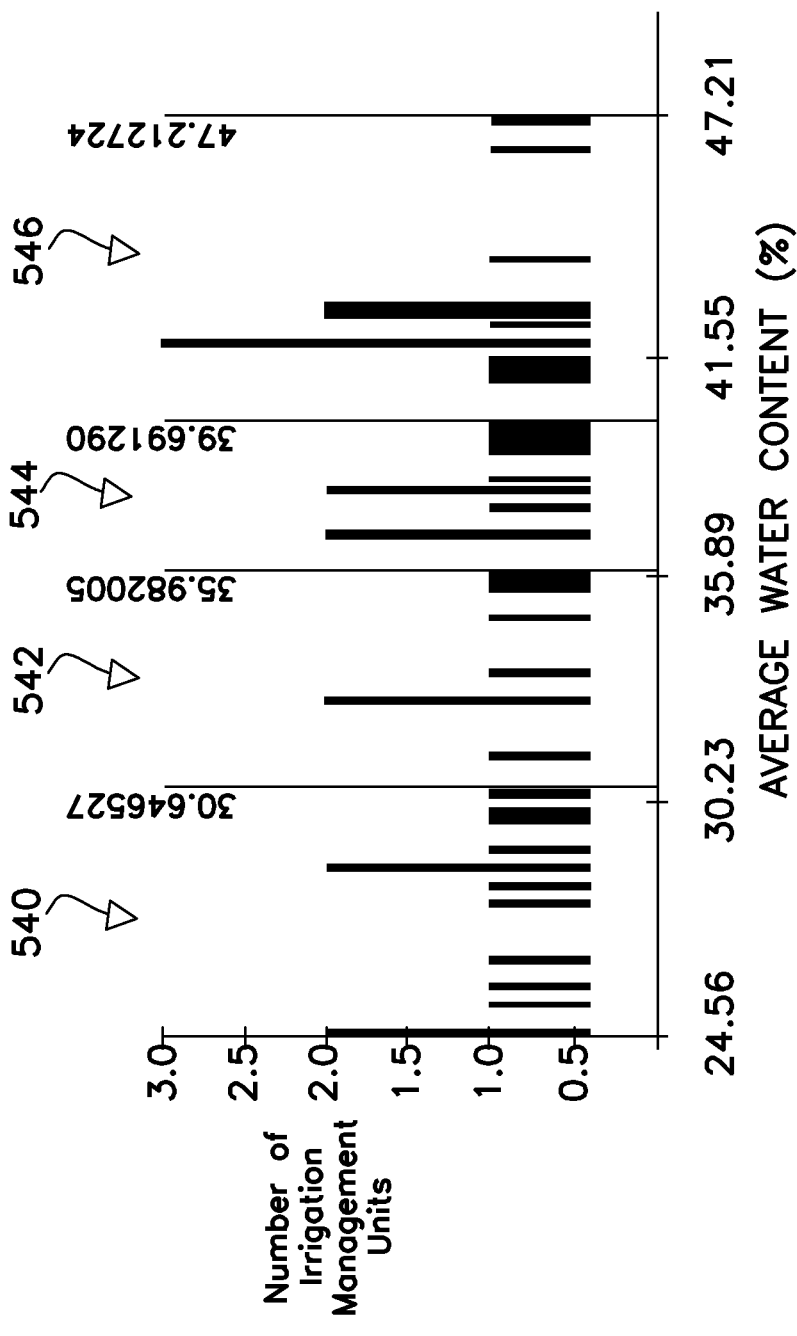
FIG. 14 is a diagram illustrating the classification of irrigation management units into irrigation management zones by turf management system shown in FIG. 1.
Figure 15:
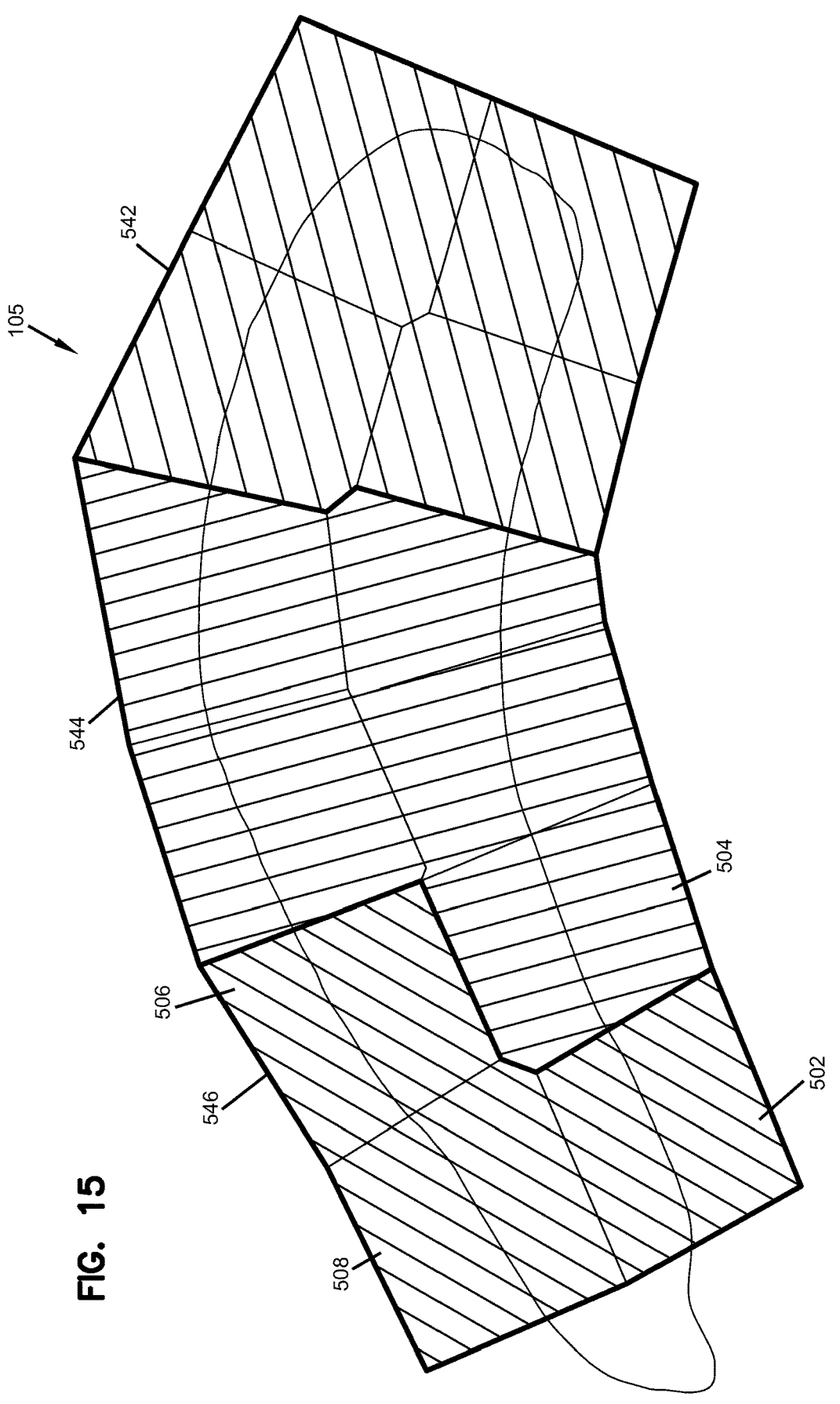
FIG. 15 illustrates the classification of irrigation management units into irrigation management zones with the turf management system shown in FIG. 1.

FIGS. 14-15 illustrate an example of the irrigation management zoning engine 434, shown in FIG. 9.

FIG. 14 is a diagram illustrating the classification of irrigation management units into irrigation management zones. FIG. 15 is a graphical representation of the irrigation management zones.

After identifying irrigation management units and average values of various qualities of the turf in each irrigation management unit, the irrigation management zoning engine performs operations to classify the irrigation management units into multiple irrigation management zones, where each of the irrigation management units that are included within a single irrigation management zone have similar characteristics.

One example method of classifying irrigation management units into irrigation management zones is to compare the average water content values for each irrigation management unit.

FIG. 14 is a plot of water content values for each irrigation management unit verses the number of irrigation management units that have that value. Next, the irrigation management units are classified into a number of irrigation management zones. In one example embodiment, the number of irrigation management zones is between four and six zones. Other embodiments include other numbers of zones.

It is generally preferred to keep the number of zones as low as possible, while still providing an advantage of the classification into zones. A benefit of classifying the units into common zones is that fewer control parameters need to be defined for the entire turf site 101. For example, the turf site may be divided into ten, twenty, or a hundred or more different irrigation management units. While each irrigation management unit could be separately controlled, it would require that control parameters be identified for each unit. By classifying the irrigation management units into a smaller set of irrigation management zones, many fewer control parameters need to be identified, and the superintendent can more easily manage each zone.

The number of irrigation management zones should be less than the total number of irrigation management units, such that at least some of the zones include two or more irrigation management units. On the other hand, the number of irrigation management zones should be large enough that most or all of the different sections of the turf site 101 (such as each fairway), have at least two zones—unless a given section is highly uniform.

In this example, it has been determined that the irrigation management units (including those in fairway 105, as well as all other sections of turf site 101) will be classified into four irrigation management zones. The classification is performed based on the average water content values for each unit, such that the irrigation management units having the lowest values are assigned to irrigation management zone 540, the next irrigation management units are assigned to irrigation management zone 542, the next irrigation management units are assigned to irrigation management zone 544, and the irrigation management units with the highest water content are assigned to irrigation management zone 546.

Various techniques can be used to determine where to separate irrigation management units between adjacent zones. For example, if an irrigation management unit has a value of 30, whether the unit should be placed into zone 540 or zone 542. One method of classifying the zones is to determine the total number of irrigation management units, and divide that number by the number of irrigation management zones. Then, the lowest number of units is assigned to zone 540, etc.

Another embodiment utilizes an algorithm to compute the locations of natural breaks between zones. For example, the Jenks Natural Breaks Classification method can be used to identify natural breaks in the data to assign the irrigation management units to the appropriate zones. Some embodiments of the irrigation management zoning engine 434 utilize the Natural Breaks tool of the ArcView geographic information system distributed by Environmental Systems Research Institute, Inc. of Redlands, CA.

FIG. 15 illustrates the classification of irrigation management units into irrigation management zones for a section (fairway 105) of the turf site 101. In this example, the irrigation management units have been classified into irrigation management zones 542, 544, and 546. For example, irrigation management zone 546 includes irrigation management units 502, 506, and 508.

In some embodiments, once the irrigation management units have been assigned an irrigation management zone, each irrigation management zone can be assigned an average value, such as an average water content value based on the average water content values of the irrigation management units included in that zone. Based on this value, the irrigation management zoning module 420 can determine appropriate control parameters for the irrigation control system. For example, based on the water content values, the amount of water that needs to be applied to the turf in the irrigation management zone can be identified. In some embodiments the quantity of water is based on a duration of time that the sprinkler valves should be opened. In some embodiments, the control parameters are a function of an in-ground moisture sensor signal. Some embodiments utilize an evapotranspiration (ET) sensor. For example, the control parameter can identify an amount of time to turn on the sprinkler once the in-ground water sensor signal identifies a water content below a threshold value. An example of an in-ground moisture sensor is the Turf Guard™ soil sensor available from The Toro Company. The system may include further rules, such as to only water during certain hours of each day.

Other control parameters can also be assigned. For example, in some embodiments the frequency of application is assigned. The frequency relates to the number of on-off cycles that should be used for a single application. Stated another way, the frequency relates to the number of rest periods that are included in a single watering session, including the duration and quantity of the rest periods. For example, if water is being applied to an area with a steep slope, it may be advantageous to apply the water in several shorter applications, with a rest period in-between that permits the water time to soak into the turf. As another example, multiple on-off cycles may be advantageous in areas where the soil is compacted. In some embodiments the frequency of application is set to a default value, such as for a single application. The default value can then be adjusted, such as by the fine tuning module.

In some embodiments, at least one in-ground moisture sensor is installed in each irrigation management zone. In some embodiments, only a single sensor is used for each zone. Because all irrigation management units within the zone have been determined to have similar characteristics, a single in-ground moisture sensor can be installed in an "average" location (such as by referring to one or more of the graphical data representations described herein). This reduces the number of in-ground moisture sensors that are required in the turf site 101, while providing the information needed to efficiently operate the irrigation system 102.

In some embodiments, one or more soil samples are collected from each irrigation management unit, or each irrigation management zone. The soil sample is analyzed to determine the soil texture classification, or to identify other characteristics of the soil. The data can then be used, for example, to control the irrigation system accordingly.

Figure 16:
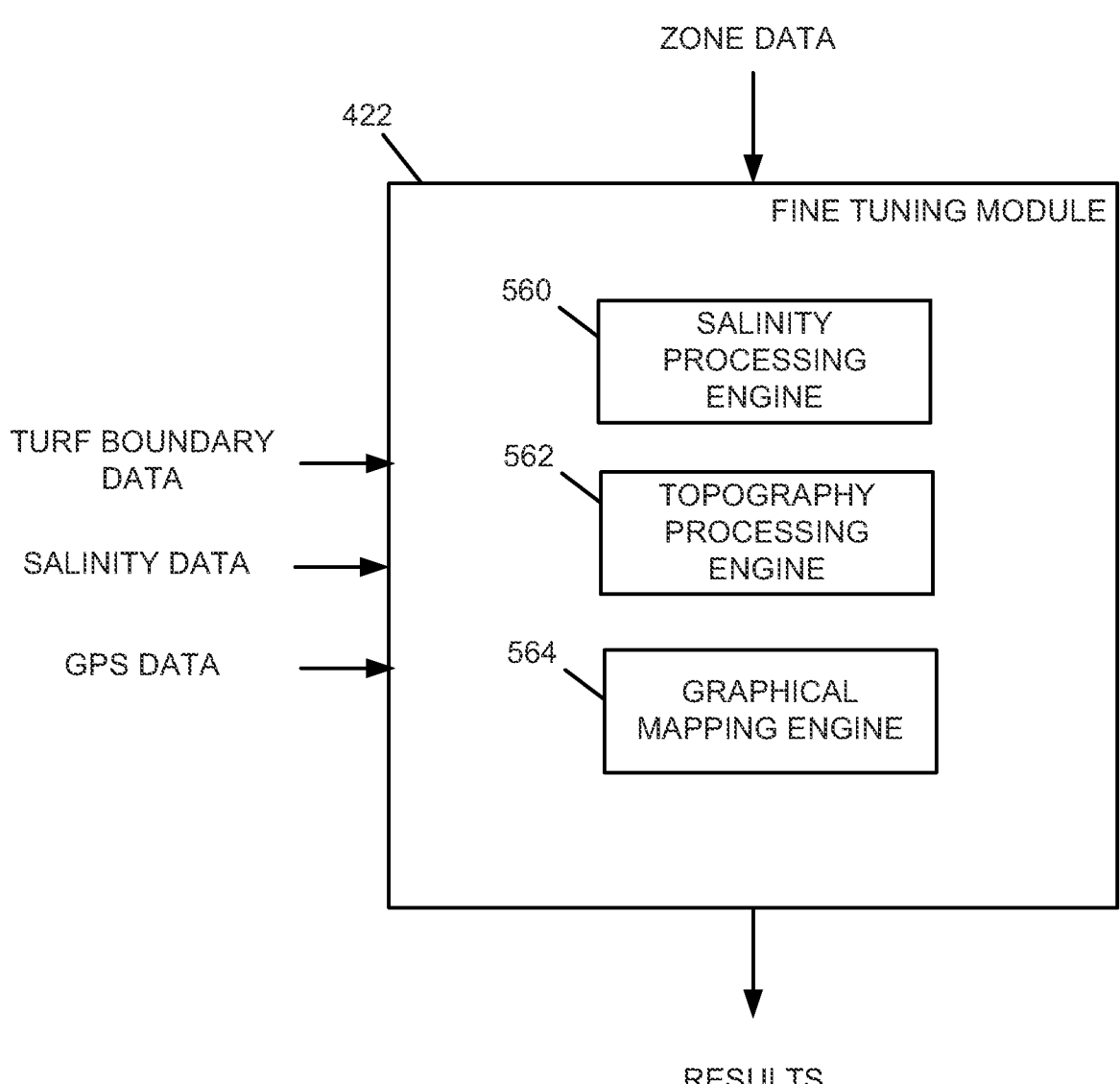
FIG. 16 is a schematic block diagram of a fine tuning module of the turf management system shown in FIG. 1.

FIG. 16 is a schematic block diagram of fine tuning module 422 of the data processing lab 142, shown in FIG. 8. In this example, fine tuning module 422 includes salinity processing engine 560, topography processing engine 562, and graphical mapping engine 564.

In some embodiments, irrigation management zones are at least initially determined based on water content. However, it is recognized the moisture content alone does not give a complete picture of the moisture requirements of a given irrigation management unit. Rather, there are additional factors that can influence the amount of water that needs to be provided to an irrigation management unit, and the way in which the water should be delivered. Examples of these factors include salinity and topography.

Salinity processing engine 560 performs data processing to evaluate the salinity of irrigation management units of turf site 101. Salinity is the salt content in the turf 103 of turf site 101. The primary source of salt is the water from the irrigation system 102. If water applied to the turf 103 does not soak through the turf 103, the water can evaporate or be consumed by the turf 103, while the salt content of the water is left behind to accumulate in the turf 103. Excess salt can be detrimental to the health of the turf 103. To remove excess salt, a leaching process can be performed to provide an excess of water (referred to as the leaching fraction) to the turf 103, to flush the salt from the turf 103. The leaching fraction is the amount of water that must be applied to the turf 103, in excess of the amount to be consumed by the turf 103, to cause a flushing of the salt from the turf 103.

In some embodiments, the salinity processing engine 560 determines the average salinity of the turf 103 for each irrigation management unit. Once the salinity is known, the salinity processing engine 560 can be utilized to adjust the irrigation management zones, or to modify the control parameters for the irrigation management zones. In some embodiments, salinity processing engine 560 generates control parameters for operating the irrigation system 102 in a leaching mode. An example of salinity processing engine 560 is illustrated and described with reference to FIG. 17.

Topography processing engine 562 operates to evaluate the topography of the turf site 101, to determine how the topography might influence irrigation needs for the irrigation management units. In some embodiments the topography processing engine 562 evaluates both the steepness of the turf 103 in each irrigation management unit, and also the aspect of the turf 103. The aspect of the turf is the direction in which the turf 103 is facing at a given point, such as North, South, East, or West. In some embodiments, the aspect is computed as a degree, where North is 0 degrees, East is 90 degrees, South is 180 degrees, and West is 270 degrees.

Graphical mapping engine 564 is provided to generate graphical representations of data, for presentation of the data to a human.

Figure 17:
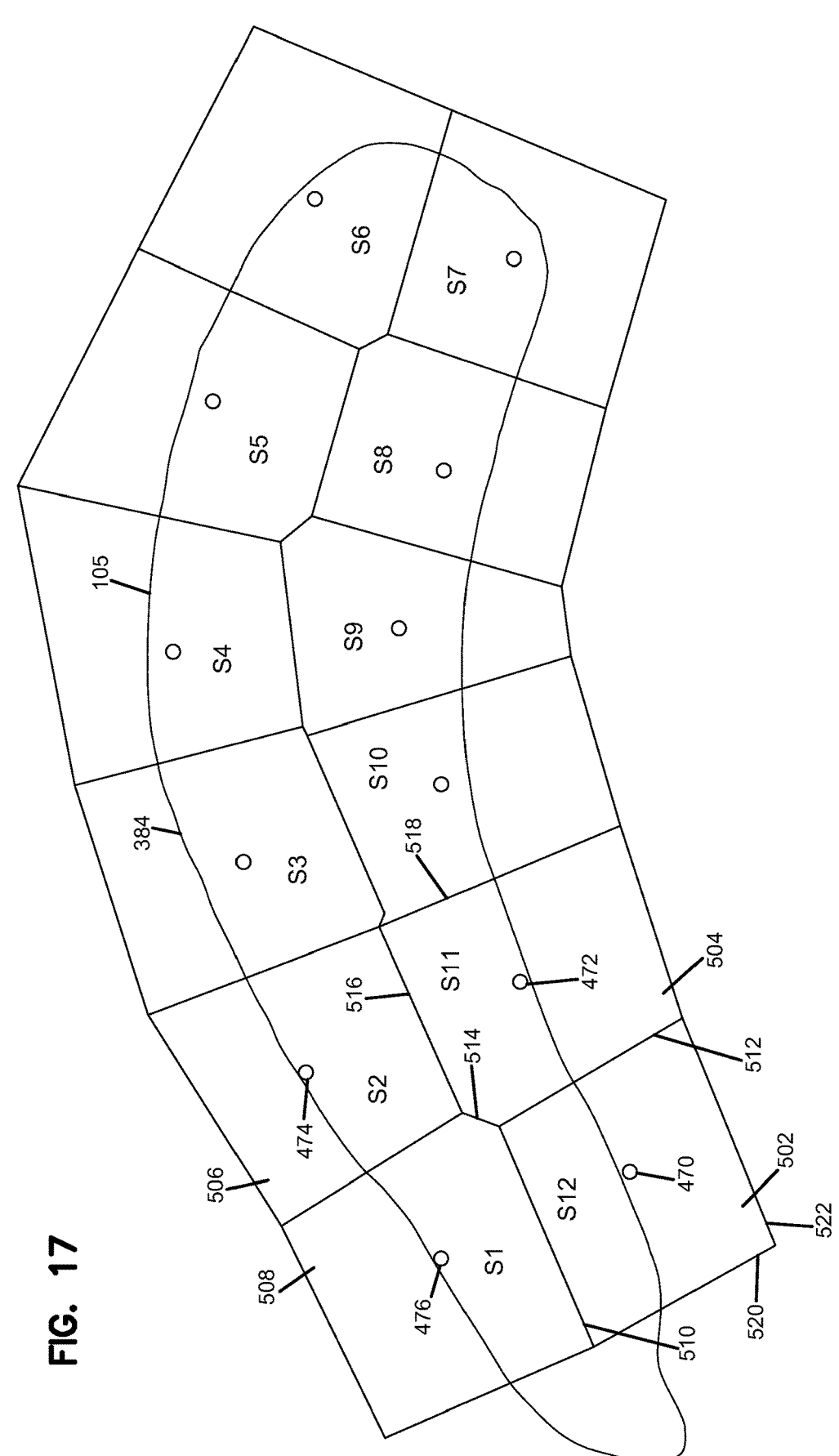
FIG. 17 is a graphical representation of operations performed by a salinity processing engine of the turf management system shown in FIG. 1.

FIG. 17 is a graphical representation of operations performed by salinity processing engine 560 to evaluate the salinity of the soil at turf site 101. The salinity processing engine utilizes the same irrigation management units 502, 504, 506, 508, etc. generated by the irrigation management zoning module 420 (shown in FIG. 9), as well as the salinity data collected for the turf site in operation 352 (shown in FIG. 5) and interpolated by the interpolation engine 430 (shown in FIG. 9).

In some embodiments, the salinity processing engine 560 computes average salinity values (S) for each irrigation management unit, in a similar manner that the water content values can be computed for each irrigation management unit (as discussed herein with reference to FIG. 13). All salinity values (either fine data points 450, shown in FIG. 10, or collected data points 460, shown in FIG. 7, or both) within an irrigation management unit are identified, and the average of those values is computed (S). The average value (S) is then assigned as the average value (S) for the irrigation management unit. For example, irrigation management unit 502 is assigned an average salinity value of S12. The process is repeated to identify average salinity values (S1-S11) for each irrigation management unit of the turf site 101.

Once salinity values have been determined, a graphical representation of the values can be generated by graphical mapping engine 564 (shown in FIG. 16). The graphical representation can be similar to the example shown in FIG. 17, and can further include the values (S1-S12), if desired. In another possible embodiment, each irrigation management unit is displayed in a color associated with the value. For example, the color can be a range of colors from a light color to a dark color depending on the salinity value. In another possible embodiment, any irrigation management unit having values within a first range of values are displayed with a first color. Any irrigation management unit having values within a second range of values are displayed with a second color, etc. The graphical representations of the salinity values permit a human to evaluate the salinity values and determine whether adjustments should be made to the preliminary irrigation management zones, or whether adjustments should be made to control parameters of irrigation system 102.

In some embodiments, salinity zones are defined based on the salinity values (S1-S12) for each irrigation management unit. Salinity zones can be defined in the same way that irrigation management zones are defined, as discussed herein. Once salinity zones have been defined, the irrigation system 102 can be programmed to operate in a leaching mode. When in the leaching mode, a leaching fraction of water can be provided in addition to the normal water needs of the zone, to flush the salt from the turf 103. Because the leaching fraction is applied only to those irrigation management units or zones with high salt content, water is saved. More specifically, the leaching fraction is not supplied to irrigation management units or zones that do not have a high salt content, thereby reducing the amount of water used during the leaching operation as compared with the application of water to the entire turf site 101 during a leaching operation.

In some embodiments, salinity data is used to at least modify irrigation system control parameters. During a watering cycle, water content data may indicate that a certain quantity of water should be applied to the irrigation management units within an irrigation management zone. The salinity data can be used to increase the amount of water to be supplied to irrigation management units or zones so as to provide an additional leaching fraction. In some embodiments in-ground salinity sensors are used to monitor the salinity levels in the turf 103, and to initiate the leaching mode when the salinity levels reach a threshold level.

Figure 18:
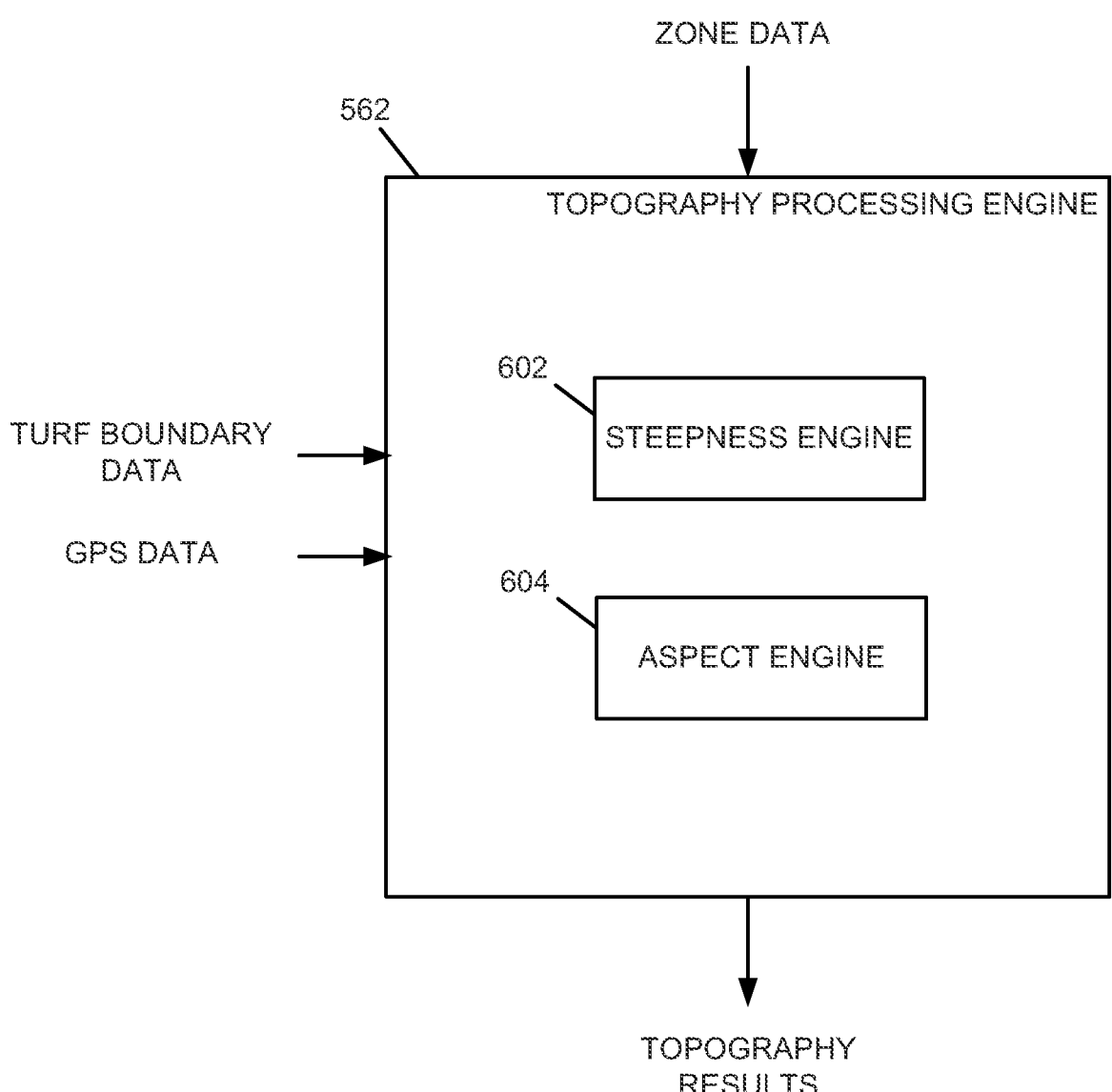
FIG. 18 is a schematic block diagram of a topography processing engine of the turf management system shown in FIG. 1.

FIG. 18 is a schematic block diagram of the topography processing engine 562. In some embodiments, topography processing engine 562 is part of the fine tuning engine 422, shown in FIG. 16, which is part of the data processing lab 142, shown in FIG. 8. In this example, topography processing engine 562 includes steepness engine 602 and aspect engine 604.

The topography processing engine 562 is used to evaluate the topography of the turf site 101, such as to identify possible adjustments that can be made to the irrigation management zones, or to the control parameters of the irrigation system 102. In some embodiments the topography processing engine 562 evaluates at least two aspects of the topography, including the steepness of the turf 103 and the aspect of the turf 103. Steepness and aspect are both characteristics of the slope of the turf 103.

Steepness engine 602 operates to evaluate the steepness of the turf 103 of the turf site 101. In some embodiments, the steepness engine 602 evaluates the GPS data to determine localized steepness values. The data is then averaged across each irrigation management unit to generate a steepness score. The steepness score for each irrigation management unit is then stored in memory, and can be used to display a graphic representation of the steepness, such as using the graphical mapping engine 564, shown in FIG. 16. The steepness can then be used to adjust the frequency at which water is supplied to the turf. For example, if the turf in an irrigation management unit is relatively flat, it may be suitable to apply the water in a single sustained application. On the other hand, if the turf in an irrigation management unit has a steep slope, a sustained application of water may result in water running off of the slope without soaking into the turf. Therefore, it may be preferable to apply the water to an area with a steep slope in several shorter intervals with periods of time in-between to permit the water time to soak into the turf. An example of the steepness engine 602 is illustrated and described herein with reference to FIG. 19.

Aspect engine 604 operates to evaluate the horizontal direction that the turf faces, such as North, South, East, or West. Aspect can influence the amount of moisture that is required by the turf. For example, in the northern hemisphere, south facing surfaces tend to receive more direct sunlight than northern facing surfaces. Therefore, the moisture requirement of the turf in a southern facing irrigation management unit will be greater than turf facing other directions. The aspect engine evaluates the aspect of the turf in each irrigation management unit, and determines an overall aspect score for each irrigation management unit, which is saved in memory. The aspect score can then be used to adjust control parameters of the irrigation system 102, for example. An example of the aspect engine 604 is illustrated and described with reference to FIG. 19.

FIG. 19 is a chart illustrating the operation of the steepness engine 602, shown in FIG. 18. In some embodiments, the steepness engine 602 operates to evaluate the slope steepness of turf in turf site 101, and to assign average steepness values to each irrigation management unit of turf site 101.

steepness engine 602 receives as an input GPS data, which is part of the collected data of operation 352, shown in FIG. 5. Most GPS units do not measure steepness values directly, and therefore steepness engine 602 must perform processing steps on GPS data to generate steepness values. Steepness values can be computed from the latitude, longitude, and altitude values, where the steepness is equal to the rise (difference in altitude) over the run (different in distance based on latitude and longitude). It has been found that the altitude values that are recorded by a typical GPS system are not, themselves, highly reliable. However, differences between two collected and adjacent altitude values tend to have greater reliability. Further, these values can be interpolated, such as using the Kriging technique described elsewhere herein, to define spatial relationships between the altitude difference values (in other words, to compare data points with other surrounding data points) to provide even more reliable data. The steepness engine 602 utilizes this process to compute fine data points for all parts of the turf site 101.

Once the fine data points have been computed, the steepness engine 602 identifies all data points without the boundaries of a given irrigation management unit, and computes an average steepness value for that irrigation management unit. The process is repeated for all irrigation management units, and the average steepness values are stored in memory.

In some embodiments, the steepness engine 602 assigns a steepness score to each irrigation management unit. The steepness score is assigned, for example, as shown in FIG. 19. In this example, the average steepness values are classified into six different categories, ranging from flat, to moderate steepness, to a steep slope. A flat slope (e.g., less than 2.6 degrees) is given a first steepness score, such as 0. A steep slope (e.g., greater than 12 degrees) is given a sixth steepness score, such as 50. Slopes between flat and steep are given appropriate second, third, fourth, and fifth scores, such as 10, 20, 30, and 40 respectively. The steepness scores for each irrigation management unit are then stored in memory.

The steepness scores (or average steepness values) can be used by the graphical mapping engine 564 to generate a graphical representation of the slope steepnesses on a site map. For example, irrigation management units having a score of 0 are given a first color. Scores of 10, 20, 30, 40, and 50 are given different colors. The graphical representation is useful to a human to visualize the steepness data, such as to identify desired adjustments to the irrigation system 102, or modifications to control parameters of the irrigation control system 120.

Figure 20:
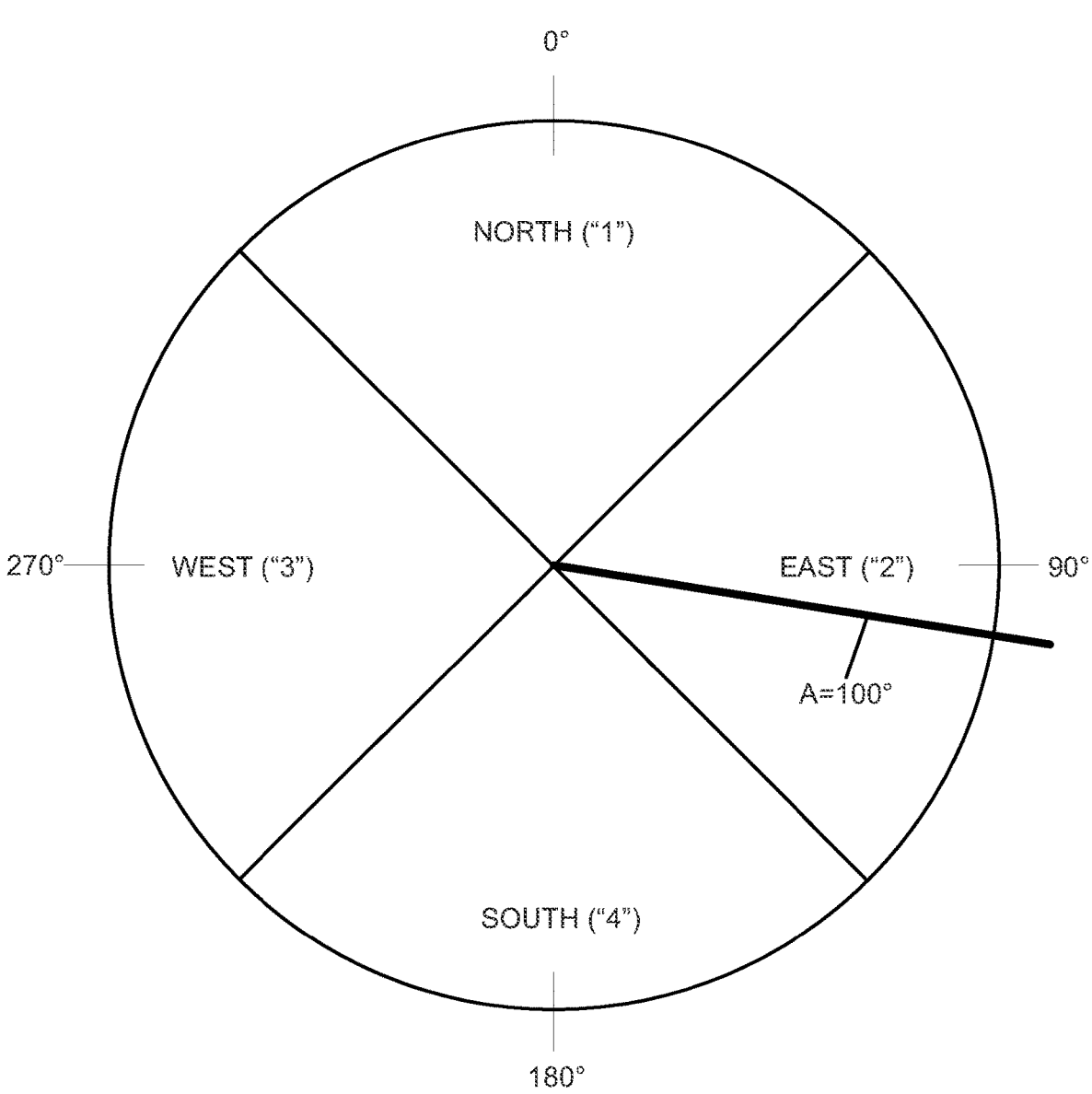
FIG. 20 is a diagram illustrating the operation of an aspect engine of the turf management system shown in FIG. 1.

FIG. 20 is a diagram illustrating the operation of the aspect engine 604, shown in FIG. 18. In some embodiments, the aspect engine 604 is a portion of the topography processing engine 562, which is a portion of the fine tuning module 422, shown in FIG. 16, which is a portion of the data processing lab 142, shown in FIG. 8.

The aspect engine 604 operates to evaluate the direction that the turf 103 of turf site 101 faces, such as to assign an aspect value and an aspect score to each irrigation management unit.

The data computed by the steepness engine 602 can be utilized by aspect engine 604. In some embodiments the aspect engine 604 begins by computing aspect directions for each data point. The aspect direction is, for example, the horizontal component of a line normal to the turf surface. The aspect values can be computed using the latitude, longitude, and aspect values, such as by comparing adjacent values to each other. Interpolation can be used to obtain fine data points, as discussed herein.

Once the aspect data points have been computed, an overall aspect value is identified for each irrigation management unit, as shown in FIG. 20. Each aspect value data point is an angle, where 0° represents due North, 90° represents due East, 180° represents due South, and 270° represents due West. The aspect engine 604 generates aspect scores based on the aspect value, as shown in FIG. 20. In this example, the scores are based on a turf site located in the northern hemisphere. For turf sites in the southern hemisphere, the values for North and South may be reversed. In addition, for turf sites located at or about the equator, different aspect scores may be appropriate. In this example, an aspect value that is North facing (between about 315° and 45°), the data point is assigned an aspect score of 1. A data point having an aspect value that is East facing (between about 45° and 135° is assigned an aspect score of 2. A data point having an aspect value that is West facing (between about 135° and 225°) is assigned an aspect score of 3. A data point having an aspect value that is South facing (between about 225° and 315°) is assigned an aspect score of 4. Other embodiments include other scoring techniques. For example, in some embodiments other angles are used, such as to limit the definition east and west facing slopes to a smaller range of directions (e.g., East is between 67.5 and 112.5, etc.). Different aspect scores can be assigned to each direction in other embodiments. In yet another embodiment, more than four directions are used, such as including Northwest, Northeast, Southwest, and Southeast directions, and aspect scores are assigned accordingly.

An example is illustrated in FIG. 20, in which a single data point has an aspect value (A) of 100°. Because 100° is between 45° and 135°, the data point is assigned an aspect score of 2, representing an East facing slope.

Once all of the data points have been assigned an aspect score, the quantity of data points having a given score are summed for each irrigation management unit. For example, there may be 10,269 data points that have an aspect score of 1, 2,940 data points that have an aspect score of 2, etc. The aspect engine then determines which aspect score has the greatest number of data points. This aspect score is then selected and assigned as the aspect score for the irrigation management unit. The process is repeated for each irrigation management unit, and the resulting aspect scores are stored in memory.

The graphical mapping engine 564, shown in FIG. 16, can be used to display the aspect data on a map of the turf site 101, to permit visual evaluation of the results.

Figure 21:
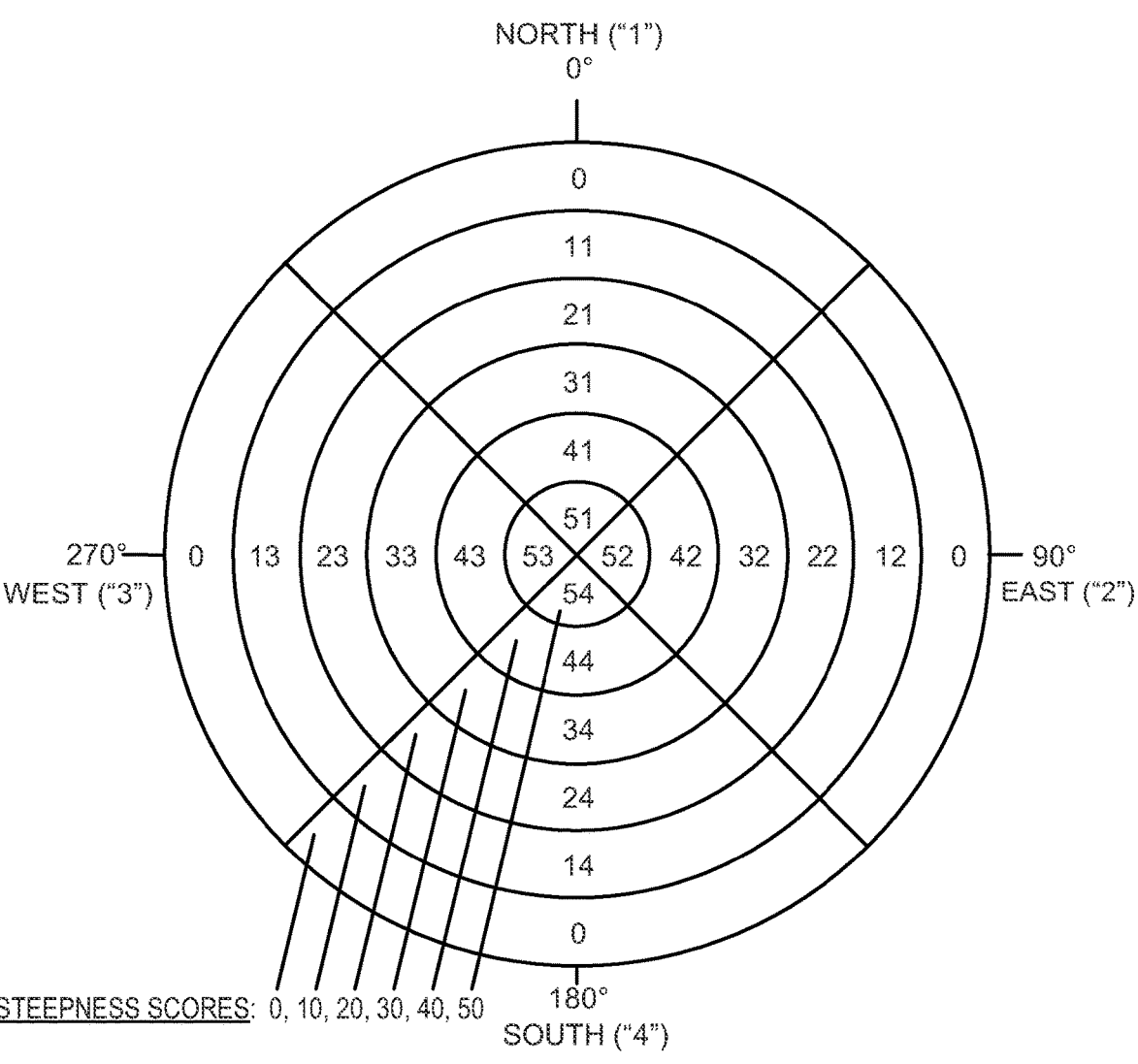
FIG. 21 is a diagram illustrating operations of the topography processing engine shown in FIG. 18.

FIG. 21 is a diagram illustrating operations of the topography processing engine 562, shown in FIG. 18, to generate a final topography score for each irrigation management unit.

Once the steepness and aspect scores have been generated by the steepness engine 602 and the aspect engine 604, shown in FIG. 18, a final topography score is generated by the topography processing engine 562 for each irrigation management unit. In some embodiments the topography score is the sum of the steepness score and the aspect score.

One example of a topography scoring algorithm is illustrated in FIG. 21, where the steepness is represented by concentric rings and the aspect is represented by angles from 0° to 360°. For example, the outer concentric ring represents irrigation management units having a flat slope that have been assigned a steepness score of zero. Steeper slopes (with steepness scores of 10 to 50) are represented by the inner concentric circles, where the innermost concentric circle represents irrigation management units having a steepness score of 50. The aspect score of each irrigation management unit is also shown. For example, an irrigation management unit having an aspect score of 0 is shown in the top of the chart (North), an aspect score of 1 is shown on the right of the chart (East), an aspect score of 2 is shown on the left of the chart (West), and an aspect score of 4 is shown on the bottom of the chart (South).

Once the steepness and aspect scores are identified for an irrigation management unit, the appropriate topography score can be assigned to the irrigation management unit.

The topography processing engine 562 retrieves the steepness and aspect scores for each irrigation management unit from memory, and utilizes the scores to identify the topography score. For example, an irrigation management unit having a flat topography (steepness score of 0 and any aspect score) is assigned a topography score of 0. An irrigation management unit having a steepness score of 20 and an aspect score of 1 is assigned a topography score of 21. Other scores are assigned as shown in FIG. 21. However, in other possible embodiments other scoring algorithms can be used.

Once the topography scores have been defined, the topography scores can be used by the graphical mapping engine 564 (shown in FIG. 16) to generate graphical representations of the data on a map of the turf site 101. For example, the topography scores can be displayed for each irrigation management unit, or each irrigation management unit can be color coded according to the topography score. In some embodiments, each aspect is assigned a color, such as blue for north, green for east, yellow for west, and red for south. The shade of the color is then determined by the steepness score, such as light for flat slopes and dark for steep slopes. Other color schemes are used in other embodiments.

In addition, in some embodiments the topography scores are used to modify control parameters for the irrigation control system 120. For example, the topography score can be used to adjust the frequency of water delivery, where irrigation management units (or zones) having a higher score can be watered using a greater frequency of water delivery (e.g., five applications of three minutes each) to permit the water time to soak in between applications. Irrigation management units (or zones) having a lower score can be watered with less frequency (e.g., a single application for fifteen minutes).

The topography score can also be used to adjust the volume of water to be applied to an irrigation management unit (or zone). For example, the control parameters for an irrigation management unit having a topography score that ends in 4 can be increased to provide more water to the irrigation management unit, while a control parameter for an irrigation management unit having a topography score of 0 can be used without further adjustment.

Similarly, topography scores can be used to suggest modifications that should be made to the irrigation system. For example, if two irrigation management units are within the same irrigation management zone, but one of the units has a topography score of 40, while the other unit has a topography score of 0, it may be beneficial to separate the irrigation management units into separate zones—such as by assigning one of the units to a different irrigation management zone.

As another example, if the sprinkler heads of two irrigation management units are currently hardwired together, or otherwise commonly controlled, different topography scores for each unit may suggest that the irrigation management units should be decoupled from each other to permit the irrigation management units to be separately managed.

Topography scores can also be used to determine a good location for an in-ground moisture sensor. The ideal location for an in-ground moisture sensor is in a location of the irrigation management zone that has "average" qualities as compared with other locations within that zone. Therefore, the topography scores can be used to identify an irrigation management unit that has a score that is roughly at a midpoint between the other scores. The in-ground moisture sensor can then be inserted in that irrigation management zone.

Referring now back to FIG. 1, after the data processing of the data processing lab 142 has been completed, the results can be transferred to the turf site 101. For example, physical adjustments can be made to the irrigation system 102 to improve the performance of the irrigation system. Such modifications may include, for example, the installation or moving of in-ground moisture sensors, the installation or moving of sprinkler heads, the re-wiring of already installed sprinkler heads, the replacement of sprinkler heads that were found to be underperforming, or other physical modifications. The data processing lab 142 can also generate control parameters that can be programmed into the irrigation control system 120 to modify the operation of the irrigation system. In another possible embodiment, the data is presented in a printed or electronic form as a report, and the report is presented to the superintendent or manager of the turf site 101. The superintendent or manager may then review the data and make whatever adjustments he or she deems appropriate based on the data in the report.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for watering a turf site, the system comprising:
   a mobile vehicle;
   a sensor mounted on the mobile vehicle, the sensor measuring at least one parameter, and the sensor being spaced away from turf in the turf site;
   a processing device; and
   a memory device storing computer readable instructions executable by the processing device to cause the processing device to:
   define at least one surface area boundary for an irrigation management unit by:
   identifying sprinkler head locations;
   locating a midpoint between at least two sprinkler head locations; and
   drawing a portion of the at least one surface area boundary through the midpoint;
   control a first plurality of fixed sprinkler heads within a first irrigation management zone according to a first control parameter, the first irrigation management zone including one or more irrigation management units each defined by surface area boundaries where all points within each irrigation management unit are closer to a respective sprinkler head in the first irrigation management zone than to any other sprinkler head in the first irrigation management zone, the irrigation management units of the first irrigation management zone having a first common characteristic;
   control a second plurality of fixed sprinkler heads within a second irrigation management zone according to a second control parameter, the second irrigation management zone including one or more irrigation management units each defined by surface area boundaries where all points within each irrigation management unit are closer to a respective sprinkler head in the second irrigation management zone than to any other sprinkler head in the second irrigation management zone, the irrigation management units of the second irrigation management zone having a second common characteristic;
   receive measurements of the at least one parameter from the sensor mounted on the mobile vehicle at each irrigation management unit of the one or more irrigation management units in the first and second irrigation management zones; and
   adjust the first and second control parameters based on the measurements of the at least one parameter of the one or more irrigation management units in the first and second irrigation management zones, respectively.

2. The system of claim 1, further comprising:
   the first and second pluralities of fixed sprinkler heads; and
   water lines connected to a source of water and to valves that control the flow of water through the first and second pluralities of fixed sprinkler heads.

3. The system of claim 1, wherein the measurements of the at least one parameter include moisture measurements of the irrigation management units.

4. The system of claim 1, wherein adjust the first and second control parameters includes adjusting a frequency at which water is supplied to the irrigation management units in the first and second irrigation management zones.

5. The system of claim 1, wherein adjust the first and second control parameters includes adjusting a duration at which water is supplied to the irrigation management units in the first and second irrigation management zones.

6. The system of claim 1, wherein the first control parameter differs from the second control parameter based on a difference of the first common characteristic from the second common characteristic.

7. The system of claim 1, wherein the one or more irrigation management units are classified into the first irrigation management zone or the second irrigation management zone independently of their physical location.

8. The system of claim 1, wherein the first and second common characteristics include a turf characteristic or an intended recreational use.

9. The system of claim 1, wherein each fixed sprinkler head of the first and second pluralities of fixed sprinkler heads is individually controllable.

10. A method of watering a turf site, the method comprising:

measuring at least one parameter by driving a mobile data collection device across the turf site, the mobile data collection device including a sensor spaced away from turf in the turf site for measuring the at least one parameter;

defining at least one surface area boundary for an irrigation management unit by:
    identifying sprinkler head locations;
    locating a midpoint between at least two sprinkler head locations; and
    drawing a portion of the at least one surface area boundary through the midpoint;

controlling a first plurality of fixed sprinkler heads within a first irrigation management zone according to a first control parameter, the first irrigation management zone including one or more irrigation management units each defined by surface area boundaries where all points within each irrigation management unit are closer to a respective sprinkler head in the first irrigation management zone than to any other sprinkler head in the first irrigation management zone, the irrigation management units of the first irrigation management zone having a first common characteristic;

controlling a second plurality of fixed sprinkler heads within a second irrigation management zone according to a second control parameter, the second irrigation management zone including one or more irrigation management units each defined by surface area boundaries where all points within each irrigation management unit are closer to a respective sprinkler head in the second irrigation management zone than to any other sprinkler head in the second irrigation management zone, the irrigation management units of the second irrigation management zone having a second common characteristic;

receiving measurements of the at least one parameter of the irrigation management units; and adjusting the first and second control parameters based on the measurements of the at least one parameter of the irrigation management units in the first and second irrigation management zones.

11. The method of claim 10, wherein the measurements of the at least one parameter include moisture measurements of the irrigation management units.

12. The method of claim 10, wherein adjusting the first and second control parameters includes adjusting a frequency at which water is supplied to the irrigation management units in the first and second irrigation management zones.

13. The method of claim 10, wherein adjusting the first and second control parameters includes adjusting a duration at which water is supplied to the irrigation management units in the first and second irrigation management zones.

14. The method of claim 10, wherein the first and second common characteristics include a turf characteristic or an intended recreational use.

15. A non-transitory computer readable storage device storing data instructions for controlling an irrigation system, the instructions, when executed by a computing device, cause the irrigation system to:

measure at least one parameter by having a mobile data collection device driven across a turf site, the mobile data collection device including a sensor spaced away from turf in the turf site for measuring the at least one parameter;

define at least one surface area boundary for an irrigation management unit by:
    identifying sprinkler head locations;
    locating a midpoint between at least two sprinkler head locations; and
    drawing a portion of the at least one surface area boundary through the midpoint;

control a first plurality of fixed sprinkler heads within a first irrigation management zone according to a first control parameter, the first irrigation management zone including one or more irrigation management units each defined by surface area boundaries where all points within each irrigation management unit are closer to a respective sprinkler head in the first irrigation management zone than to any other sprinkler head in the first irrigation management zone, the irrigation management units of the first irrigation management zone having a first common characteristic;

control a second plurality of fixed sprinkler heads within a second irrigation management zone according to a second control parameter, the second irrigation management zone including one or more irrigation management units each defined by surface area boundaries where all points within each irrigation management unit are closer to a respective sprinkler head in the second irrigation management zone than to any other sprinkler head in the second irrigation management zone, the irrigation management units of the second irrigation management zone having a second common characteristic;

receive measurements of the at least one parameter of the irrigation management units in the first and second irrigation management zones; and adjust the first and second control parameters based on the measurements of the at least one parameter of the irrigation management units in the first and second irrigation management zones.

16. The non-transitory computer readable storage device of claim 15, wherein adjust the first and second control parameters includes adjusting a frequency, a duration, or both the frequency and the duration at which water is supplied to the irrigation management units in the first and second irrigation management zones.

17. The non-transitory computer readable storage device of claim 15, wherein the first and second common characteristics include a turf characteristic or an intended recreational use.

\* \* \* \* \*